US007614944B1

(12) United States Patent
Hughes et al.

(10) Patent No.: US 7,614,944 B1
(45) Date of Patent: Nov. 10, 2009

(54) SYSTEMS AND METHODS FOR PROVIDING MULTI-LEVEL FANTASY SPORTS CONTESTS IN FANTASY SPORTS CONTEST APPLICATIONS

(75) Inventors: Patrick J Hughes, Vienna, VA (US); William Junkin, Corona Del Mar, CA (US); Dave Barber, Tulsa, OK (US)

(73) Assignee: Interactive Sports Holdings, Inc., Tulsa, OK (US)

( * ) Notice: Subject to any disclaimer, the term of this patent is extended or adjusted under 35 U.S.C. 154(b) by 1210 days.

(21) Appl. No.: 10/234,346

(22) Filed: Aug. 30, 2002

(51) Int. Cl.
    *A63F 13/00* (2006.01)
(52) U.S. Cl. ...................................................... 463/4
(58) Field of Classification Search .............. 700/91–93; 463/1–6, 29, 42
    See application file for complete search history.

(56) References Cited

U.S. PATENT DOCUMENTS

| | | | | |
|---|---|---|---|---|
| 4,918,603 | A | 4/1990 | Hughes et al. | 364/410 |
| 5,018,736 | A | 5/1991 | Pearson et al. | 273/439 |
| 5,263,723 | A | 11/1993 | Pearson et al. | 273/439 |
| 5,636,920 | A * | 6/1997 | Shur et al. | 700/91 |
| 5,794,210 | A | 8/1998 | Goldhaber et al. | |
| 5,846,132 | A * | 12/1998 | Junkin | 463/42 |
| 5,848,397 | A | 12/1998 | Marsh et al. | |
| 5,860,862 | A * | 1/1999 | Junkin | 463/40 |
| 5,971,854 | A | 10/1999 | Pearson et al. | 463/41 |
| 6,015,344 | A * | 1/2000 | Kelly et al. | 463/16 |
| 6,110,041 | A * | 8/2000 | Walker et al. | 463/20 |
| 6,135,881 | A | 10/2000 | Abbott et al. | |
| 6,193,610 | B1 * | 2/2001 | Junkin | 463/40 |
| 6,371,855 | B1 * | 4/2002 | Gavriloff | 463/42 |
| 6,837,789 | B2 | 1/2005 | Garahi et al. | |
| 6,837,791 | B1 | 1/2005 | McNutt et al. | |
| 7,001,279 | B1 | 2/2006 | Barber et al. | |
| 7,058,592 | B1 | 6/2006 | Heckerman et al. | |
| 7,136,871 | B2 | 11/2006 | Ozer et al. | |
| 2001/0036853 | A1 | 11/2001 | Thomas | |

(Continued)

FOREIGN PATENT DOCUMENTS

WO   WO 01/33482 A2   5/2001

(Continued)

OTHER PUBLICATIONS

Cliff Charpentier, "1984 Fantasy Football Digest," Fantasy Sports Inc., Jun. 1984.

(Continued)

*Primary Examiner*—Dmitry Suhol
*Assistant Examiner*—Thomas H Henry
(74) *Attorney, Agent, or Firm*—Ropes & Gray LLP

(57) ABSTRACT

Systems and methods for providing multi-level fantasy sports contests in a fantasy sports contest application are provided. The fantasy sports contest application may provide multi-level fantasy sports contest in an award league. The fantasy sports contest application may create award leagues of different levels and focus on various geographical units. In some embodiments of the present invention, the fantasy sports contest application may allow a user to enter the same team to compete in one or more leagues. In these embodiments, the same set of rules may apply to all leagues for a particular sport. In some embodiments of the present invention, the fantasy sports contest application may allow the user to advance from lower level leagues to higher level leagues having the same or cooperating sponsors. In some embodiment of the present invention, the fantasy sports contest application may allow a user to enter a team that was previously drafted for one league to compete in another league.

36 Claims, 16 Drawing Sheets

U.S. PATENT DOCUMENTS

| | | | |
|---|---|---|---|
| 2002/0046099 | A1 | 4/2002 | Frengut et al. |
| 2002/1005909 | | 5/2002 | Hosea et al. |
| 2002/0107073 | A1* | 8/2002 | Binney .................. 463/42 |
| 2003/1005488 | | 3/2003 | Pinto et al. |
| 2004/0117831 | A1 | 6/2004 | Ellis et al. |

FOREIGN PATENT DOCUMENTS

| | | |
|---|---|---|
| WO | WO-0133482 | 5/2001 |
| WO | WO 03/015403 | 2/2003 |

OTHER PUBLICATIONS

Jim Donaldson, "The Official Fantasy Football League Manual," Contemporary Books, Inc., 1985.

Cliff Charpentier, "1985 Fantasy Football Digest," Lerner Publications Company, 1985.

"All Pro Yearbook 1987: The Fantasy Football Magazine," All Pro Publishing Company, 1987.

BBC Sport, *Fantasy Football Monthly, The Game* <http://bbcfootball.fantasyleague.co.uk/ et al.> (accessed Sep. 17, 2002*).

CNN Sports Illustrated, *Fantasy Football Challenge* <http://football2201.si.cnn.com/ et al.> (accessed Sep. 23, 2002*).

CNN Sports Illustrated, *Fantasy Golf Challenge* <http://gold5.si.cnn.com/ et al.> (accessed Sep. 23, 2002*).

CNN Sports Illustrated, *Fantasy Nascar Challenge* <http://racing20.si.cnn.com/ et al.> (accessed Sep. 23, 2002*).

CBS SportsLine.com, *John B. Sample League* <http://cbs.sportsline.com/> (accessed Nov. 24, 1999).

CBS SportsLine.com, *Fantasy Baseball* <http://baseball101.fantasy.sportsline.com/ et al.> (accessed Sep. 23-24, 2002*).

CBS SportsLine.com, *Fantasy Football* <http://football2145.fantasy.sportsline.com et al.> (accessed Sep. 23-24, 2002*).

CBS SportsLine.com, *Fantasy Golf* <http://golf1.fantasy.sportsline.com/ et al.> (accessed Sep. 23, 2002*).

CBS SportsLine.com, *Fantasy Hockey* <http://hockey2102.fantasy.sportsline.com/ et al.> (accessed Sep. 23-24, 2002*).

CBS SportsLine.com, *Fantasy Racing* <http://racing.fantasy.sportsline.com/ et al.> (accessed Sep. 23, 2002*).

ESPN Internet Ventures, *ESPN Fantasy Games* <http://games.espn.go.com/cgi/home/request.dll?FRONTPAGE et al.> (accessed Sep. 10-18, 2002*).

"Fantasy-Football," Franchise Football League.

"Strat-O-Matic Pro Football," Strat-O-Matic Game Co. Inc.

"2000 Fantasy Basketball, Help Topics," Fantasy Sports Properties, Inc.

"2000 Fantasy Football, Help Topics," Fantasy Sports Properties, Inc.

"2000 Fantasy Hockey, Help Topics," Fantasy Sports Properties, Inc.

"2001 Fantasy Baseball, Help Topics," Fantasy Sports Properties, Inc.

* cited by examiner

702 — 2 Happy Meals for the Price of One

REGISTRATION

Name: John Doe
Age: 18
Sex: Male
User Name: JD
Password: ****

Submit — 704

702 — Sign up to play in store and get free fries

702 — Chicken Parmesan Sandwich only $2.99

SYSTEMS AND METHODS FOR PROVIDING MULTI-LEVEL FANTASY SPORTS CONTESTS IN FANTASY SPORTS CONTEST APPLICATIONS

BACKGROUND OF THE INVENTION

This invention relates to fantasy sports contests and, more particularly, this invention relates to systems and methods for providing multi-level fantasy sports contests in fantasy sports contest applications.

Athletic endeavors have long supported a broad range of secondary contests, which include wagering on the outcome of particular games and wagering on the performance of a particular player.

In known fantasy sports contests, a user selects a roster, a team, a particular individual, or a group of individuals in an athletic contest. The user is given the ability to take on the role of a fictional general manager with powers which may include the ability to draft, trade, dismiss and otherwise manage the player or players on the user's fantasy sports team.

Conventionally, either a fantasy sports contest provider or a league commissioner sets the rules under which a group of fantasy sports users compete against each other in a fantasy sports contest. For example, for every goal scored in real-life by a member of the user's fantasy soccer team, the user may be awarded five points in the fantasy sports contest.

The fantasy sports contest provider may also provide additional services, which may include providing statistical information on real-life games and players, tracking users' scores in the fantasy sports contest, and enabling transactions and other interactions among the users.

The real-life athletic events upon which a fantasy sports contest may be based are varied, and typically involve selecting players from real-life team sports (e.g., football, baseball, basketball, hockey, soccer, rugby, etc.), selecting players from real-life individual sports (e.g., golf, tennis, automotive racing, etc.), or selecting participants from contests involving animals (e.g., horse and dog racing). A user's selections are typically stored in the user's fantasy sports contest roster. The performance of these selections in real-life contests collectively determines the user's performance in the fantasy sports contest.

In known fantasy sports contests, a user may choose between participating in private leagues or public leagues. To participate in a private league, the user may either start the league himself or join a private league created by another user. The user who starts a private league (e.g., as the league commissioner) bears the responsibility of maintaining the league (e.g., setting rules, settling disputes, etc.) as well as the responsibility of attracting or inviting users to join the league. The user who joins a private league created by another user must participate in the private league according to the rules set by the league commissioner.

Initially, new users tend to participate more frequently in private leagues started by their friends. The familiarity of users in these private leagues generally foster friendlier competition. More experienced users, who often participate in more than one league, may find the varying rules from one private league to another frustrating.

Alternatively, the user may participate in public leagues. In response to the user choosing to participate in public leagues, a fantasy sports contest provider may randomly assign the user to a public league consisting of other users who have expressed similar preferences in fantasy sports contests. Public leagues are also often season long, which gives the user very infrequent windows of opportunity to join.

Many sponsors and advertisers of fantasy sports contests also find the limited choices between public and private leagues frustrating. For example, an advertiser for a service located on the east coast of United States may find it difficult to target its advertisements to the east coast users because public and private leagues are not organized by geographical locations. Thus, advertisers and sponsors who are not interested in a national or international customer base are deterred from advertising or sponsoring fantasy sports contests.

Accordingly, it is desirable to present improved ways for allowing the user to participate in multiple leagues having uniform rules whenever the user desires and for allowing the advertisers and sponsors to target fantasy sports users that are within their customer base.

SUMMARY OF THE INVENTION

It is therefore an object of the present invention to provide improved ways for allowing the user to participate in multiple leagues having uniform rules whenever the user desires and for allowing the advertisers and sponsors to target fantasy sports users that are within their customer base.

This and other objects are accomplished in accordance with the principles of the present invention by providing multi-level fantasy sports contests in a fantasy sports contest application.

A multi-level fantasy sports contest may be any suitable fantasy sports contest having at least the following two characteristics. First, the multi-level fantasy sports contest may be associated with a particular contest level that allows users having certain characteristics (e.g., geographical location, age, sex, profession, etc.) to participate in the multi-level fantasy sports contest. Second, the multi-level fantasy sports contest may be associated with at least one other multi-level fantasy sports contest, where the other multi-level fantasy sports contest is associated with a different contest level that allows either a broader or narrower group of users to participate. The associated multi-level fantasy sports contests may share at least one user.

The present invention is primarily described herein in terms of the fantasy sports contest award leagues. It will be understood that a multi-level fantasy sports league may not necessarily be associated with awards.

In some embodiments of the present invention, the fantasy sports contest application may create award leagues that are associated with one or more sponsors to provide multi-level fantasy sports contests. Award leagues may be any suitable fantasy sports league having one or more sponsors that offer rewards or some other form of recognition to users who compete within the league. The fantasy sports contest application may create award leagues at all levels, for example, focusing on various geographical units (e.g., New York City, Brooklyn, Calif., etc.), focusing on users with particular characteristics (e.g., age, sex, ethnic background, etc.), focusing on users preferred by one or more sponsors of the league (e.g., McDonald's customers, Microsoft company employees, etc.), focusing on any other suitable criteria, or focusing on any combination thereof.

For example, the fantasy sports contest application may create a local football award league for a community sports bar and restaurant to allow customers who regularly watch Monday Night Football at the establishment to participate in the league. The restaurant may offer incentives such as a free drink to all participants of the league on Monday night and may offer additional prizes to the winners (e.g., free dinner for two). This particular award league may benefit the restaurant owner by maintaining its existing customer base and attracting new customers. The award league may also benefit fantasy sports users who frequent the restaurant by providing a friendly environment to enjoy the game and compete.

As another example, the fantasy sports contest application may allow the McDonald's Corporation to create numerous local award leagues, multiple regional award leagues, multiple national award leagues, and an international award league to allow McDonald's customers all over the world to participate in one or more McDonald's award leagues (e.g., a World Cup Soccer League). Each local McDonald's restaurant may sponsor a local award league for its customers. Above these local award leagues, McDonald's headquarters in various countries may sponsor regional and national leagues that are accessible by customers in the appropriate geographical area. The international award league may be, for example, sponsored by the McDonald's Corporation headquarter and may be open to all McDonald's customers. The fantasy sports contest application may allow the user to simultaneously participate in McDonald's local, regional, national, and international award leagues at the same time and may award prizes to the user based on, for example, weekly scores, leaderboard standings, or any other suitable criteria. The fantasy sports contest application may direct the user to redeem the prizes, for example, at the local McDonald's restaurant, through mail, through McDonald's web site, or using any other suitable approach.

In some embodiments of the present invention, the fantasy sports contest application may allow the user to enter the same team (e.g., football team, basketball team, volleyball team, baseball team, etc.) or roster to compete in more than one award leagues. In these embodiments, the fantasy sports contest application may unify the rules for various award leagues to remove the many obstacles that the user may face in attempting to enter the same team into multiple leagues.

For example, the fantasy sports contest application may implement the same set of simple rules in all award leagues for a particular sport regardless of their levels (e.g., local, regional, national, etc.), sizes, or sponsors. As an example, the fantasy sports contest application may implement the same scoring system in the local football award league sponsored by the restaurant and the numerous football award leagues sponsored by McDonald's, which are described above. Unification of the rules overcomes numerous obstacles such as restriction on the number of players on a team that normally force the user to draft separate teams for separate leagues in known fantasy sports contest applications.

In some embodiments of the present invention, the fantasy sports contest application may also inform the user regarding which leagues adhere to a standardized set of rules. This way, the fantasy sports contest application may allow the user to, for example, maintain one roster for participating in fantasy sports leagues that allow the user to draft players by paying fictional salaries to the players and maintain another roster for participating in fantasy sports leagues that allow the user to draft players based on turns.

In some embodiments of the present invention, the fantasy sport contest application may eliminate restrictions on the number of users that may compete in an award league. The fantasy sports contest application may allow the award leagues in these embodiments to accommodate as many users as the sponsors desire. Certain known leagues may restrict league sizes because their drafts allow one athlete to be drafted onto the roster of only one user in a league. Because there are only a limited number of available athletes in any sport, the number of users in these leagues must be restricted in order to ensure that there are enough athletes to fill each user's roster.

To eliminate this restriction, the fantasy sports contest application may implement non-exclusive draft system in award leagues. In doing so, the fantasy sports contest application allows each user to draft from the whole pool of eligible athletes for that sport regardless of the picks made by other users in the league.

For example, the fantasy sports contest application may give the user a certain amount of fictional dollars to spend on drafting athletes for the user's roster in a football award league. The fantasy sports contest application may assign each available football player a fictionally dollar value based on, for example, performance from the previous season, statistical value associated with the user, real-life salary, any other suitable approach, or combination thereof. The fantasy sports contest application may then allow the user to exchange a portion of the user's wealth for athletes according to the dollar amount associated with the athlete. This draft system allows the same athlete to be drafted by multiple users, thus the fantasy sports contest application allows unlimited numbers of users to compete in a single award league.

In some embodiments of the present invention, the fantasy sports contest application may allow a user to join an award league at any time during the season. In these embodiments, the fantasy sports contest application may make all athletes available for draft by the user at any times during the season. The fantasy sports contest application may produce winners and award prizes in these award leagues on semi-cumulative or non-cumulative basis (e.g., based on weekly scores) to keep the contest challenging to all users throughout the season. In some embodiments of the present invention, the fantasy sports contest application may provide one or more sub-contests within a contest. For example, within a season long contest, the fantasy sports contest application may provide one or more weekly contests that award the users according to, for example, weekly score.

In some embodiments of the present invention, the fantasy sports contest application may allow the user to access a specific league using a unique award league code. The award league code may be any combination of numbers, letters, or any other suitable character that may uniquely identify an award league within the fantasy sports contest application. A user may obtain the award league code for accessing a particular award league by, for example, purchasing products from the sponsor of the league and receiving the award league code on the receipt, obtaining the award league code from the sponsor's advertisement in the local newspaper, or using any other suitable approach.

In some embodiments of the present invention, the fantasy sports contest application may allow the user to access a specific award league using a terminal located at the sponsor's physical location. For example, a sponsor may install one or more of such terminals in one or more of its restaurants, where customers may access the sponsor's award league (e.g., a football award league for customers of that particular restaurant).

In some embodiments of the present invention, the fantasy sports contest application may allow a user under the age of 21, who may be, for example, prevented by sweepstake rules to participate in award leagues, to participate in the award leagues under the explicit permission of a guardian or parent. For example, the fantasy sports contest application may identify an underage user and may provide a facility to allow the user to sign up with a parent or guardian. During the sign up processing, the fantasy sports contest application may request the parent or guardian to indicate explicit consent to allow the underage user to direct activities in the award league (e.g., team selection). Upon completion of the sign up process, the fantasy sports contest application may allow the underage user to participate in the award league, but may only allow the parent or guardian to collect any prizes that may be own.

In some embodiments of the present invention, the fantasy sports contest application may automatically enter a team previously drafted by the user for a first award league of a particular sport into a second award league of the same sport when the user joins the second league. By doing so, the fantasy sports contest application may force the user to maintain only one team for all award leagues in the same sports category and minimize the resources dedicated to storing and tracking the user's various rosters. This also allows the user to minimize the time spent on managing various teams.

In some embodiments of the present invention, the fantasy sports contest application may allow a user who has not previously drafted a team for an award league to select a team from the teams that the user has previously drafted for some other leagues (e.g., non-award leagues) of the same sport. In these embodiments, the fantasy sports contest application may modify a team drafted for a non-award league according to the rules of the award leagues before the fantasy sports contest application allows the user to enter the team into an award league contest. In some embodiments of the present invention, the fantasy sports contest application may provide the user with an opportunity to review the modified team before entering the team into the fantasy sports contest, thus allowing the user to cancel or otherwise modify the team based on the results of the modification.

In some embodiments of the present invention, the fantasy sports contest application may provide a collection of performance information for the user in various award leagues. Performance information may include, for example, weekly scores, league names, rankings within the leagues, prizes won, or any other suitable performance or user related information. In these embodiments, the fantasy sports contest application may present the performance information in various award leagues and links associated with prize that the user have won in these leagues on a screen. In response to a user selecting a link, the fantasy sports contest application may provide additional information about the prize to the user. Additional information about the prize may be, for example, additional information about how the user may collect the prize. According to one suitable approach, fantasy sports contest application may present the user with a one time user coupon that may be used to purchase items from the sponsor's store.

In some embodiments of the present invention, the fantasy sports contest application may provide the user with an electronic receipt for collecting a prize won in an award league. The fantasy sports contest application may generate the receipt in response to, for example, a user selecting a link associated with a prize won in an award league. The fantasy sports contest application may provide, for example, a confirmation code on the receipt, to ensure that the receipt is legitimate and to prevent the user from claiming the prize more than once. A user may print the receipt to collect the prize, for example, from the sponsor's store.

Further features of the invention, its nature and various advantages will be made apparent from the accompanying drawings and the following detailed description.

BRIEF DESCRIPTION OF THE DRAWINGS

FIG. 7 is an illustrative fantasy sports contest award league new user registration screen in accordance with one embodiment of the present invention;

DETAILED DESCRIPTION OF THE INVENTION

Figure 1:
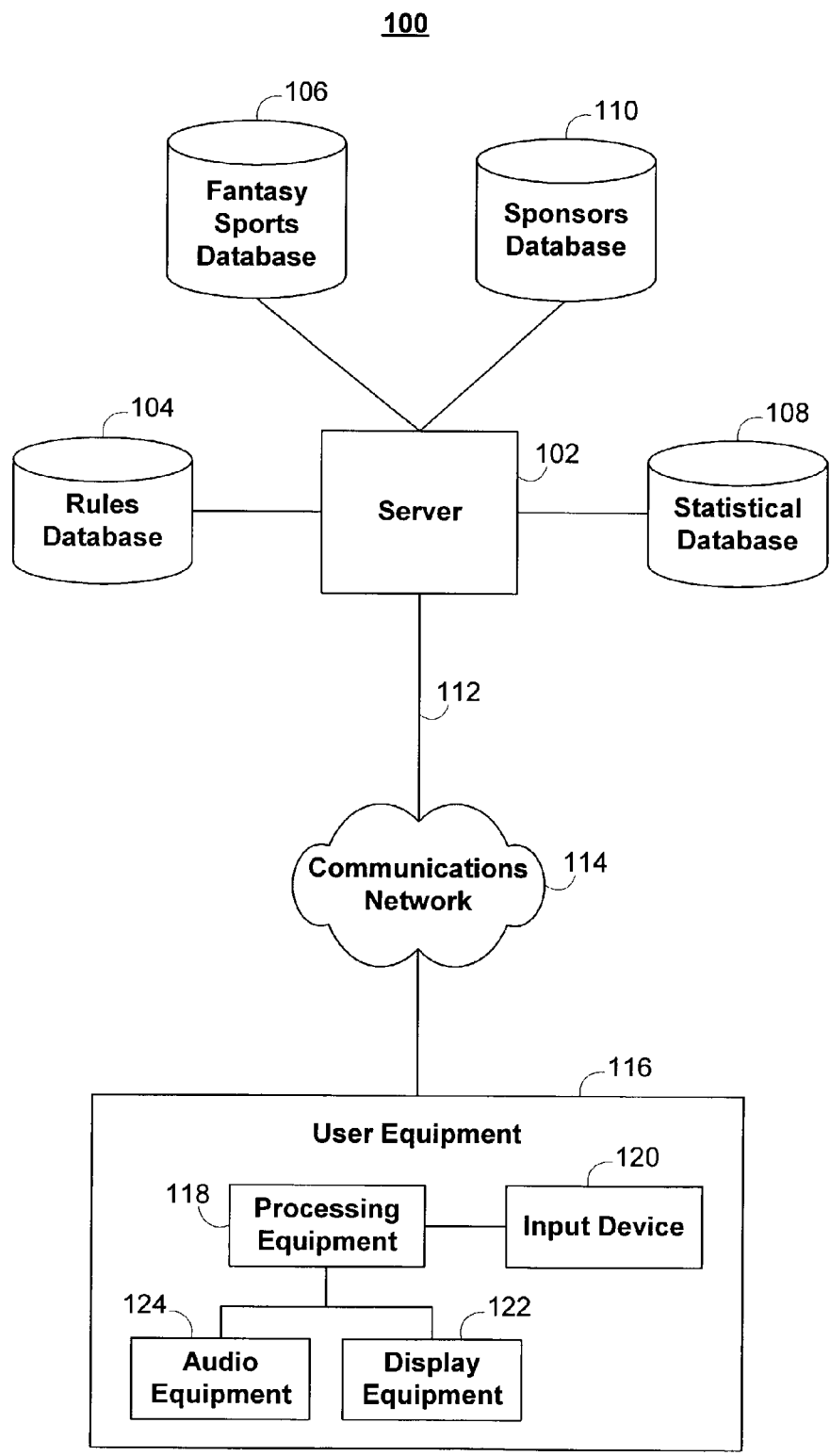
FIG. 1 is a schematic diagram of an illustrative fantasy sports contest client/server system in accordance with one embodiment of the present invention.

The fantasy sports contests of the present invention may include any suitable sports contest in which the user is given the ability to make decisions that may affect the standing of the user in the sports contest. For example, in typical team-oriented fantasy sports contests, the user may participate in the capacity of a general manager. In this situation, the user may be have responsibilities such as creating a team roster (e.g., drafting players), selecting player positions, selecting starters, selecting relievers, making trades, and otherwise maintaining the composition of the user's team roster. It will be understood that any other suitable decision-making capability may be given to the user in a fantasy sports contest in addition to or in place of those indicated above.

The fantasy sports contest of the present invention need not be limited or restricted in time. For example, a fantasy sports contest may last an entire season, a portion of the season, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests may include contests in which the user is not necessarily playing the role of a general manager. For example, fantasy sports contests may involve the user determining or guessing (i.e., blindly or with calculation) whether particular outcomes will occur (e.g., whether a particular golfer will make the next put). Any such suitable decision-making may be the basis of a fantasy sports contest or a part of a fantasy sports contest.

The fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), head-to-head systems (e.g., users in a league are matched against one another in a round-robin series of one-on-one contests during the course of a season). There are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The fantasy sports contest application of the present invention may provide to the user fantasy sports contest-related information. Fantasy sports contest-related information may include any suitable information associated with one or more fantasy sports contests in which the user participates or in which the user may have an interest. For example, fantasy sports contest-related information may include information regarding the user's one or more rosters, the user's standing in one or more fantasy sports contests, point tallies associated with the user in one or more fantasy sports contests, information regarding the number of trades that the user may make, information regarding the amount of fantasy money available to the user for contracting players for a roster, information regarding deadlines to make trades or to perform any other suitable task associated with one or more fantasy sports contests, or any other suitable information.

Fantasy sports contest-related information may also include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events that may have an affect on the one or more fantasy sports contests in which the user participates.

The present invention is primarily described herein in terms of the fantasy sports contest application. It will be understood that any other suitable software, hardware, or both may be used in conjunction with the fantasy sports contest application to implement some or all of the present invention.

FIG. 1 shows an illustrative fantasy sports contest client/server system 100 in accordance with one embodiment of the present invention. A fantasy sports contest application may be entirely or partially implemented on one or more server 102. Server 102 may access one or more databases including information related to fantasy sports such as, for example, rules database 104, fantasy sports database 106, statistical database 108, sponsors database 110, or any other suitable database.

Rules database 104 may be used to store rules for one or more fantasy sports contests. Statistical database 108 may include real-life statistical information on athletes in one or more real-life sports categories (e.g., baseball, basketball, football, etc.). Fantasy sports database 106 may store any other types of data used in conjunction with the operation of one or more particular fantasy sports (e.g., game time, game duration, etc.).

Sponsors database 110 may include information related to one or more sponsors of, for example, local, regional, national, international, or any other suitable fantasy sports leagues. Sponsor information may include, for example, sponsor name, contest or league type (local, regional, national, etc.), geographical location, prizes, or any other suitable sponsor-related information.

Communication network 114 may be used for communication between users having user equipment 116 and server 102. Multiple communication network 114 and multiple user equipment 116 may be desired, although only one of each is shown to avoid over-complicating the drawing. User equipment 116 may include processing equipment 118 for receiving and transmitting fantasy sports contest data. The user may interact with processing equipment 118 using input device 120 such as a remote control, a keyboard, a voice-recognition device, a track ball, a mouse, any other suitable device, or any combination thereof.

Fantasy sports contest data received by processing equipment 118 may be displayed for the user on display equipment 122. Display equipment 122 may be, for example, a television, a monitor, or any other suitable display equipment. Audio information generated by processing equipment 118 may be played for the user using audio equipment 124 (e.g., speakers). Audio equipment 124 may be a stand-alone equipment or integrated with display equipment 122.

Figure 2:
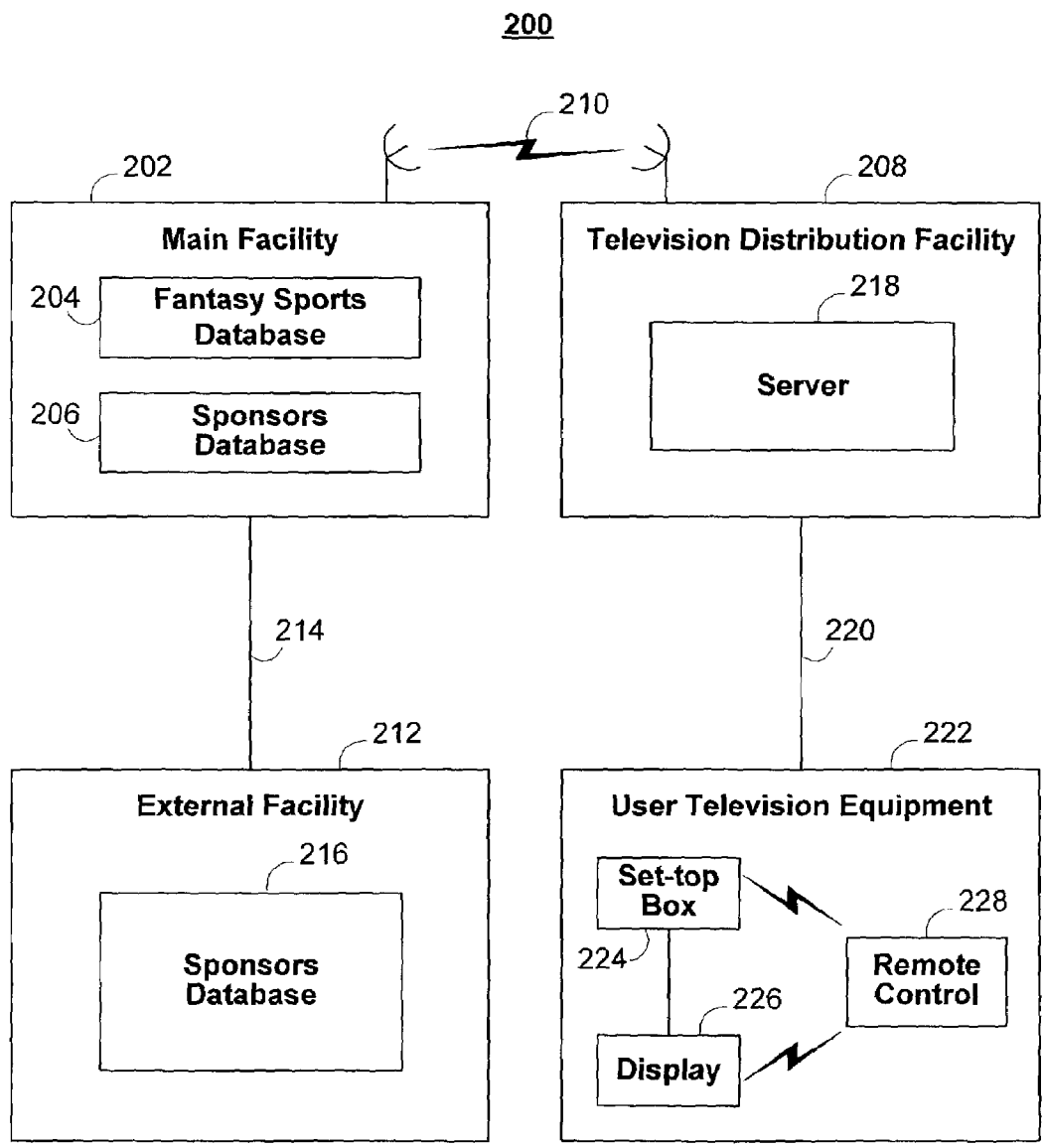
FIG. 2 is a schematic diagram of an illustrative fantasy sports contest interactive television system in accordance with one embodiment of the present invention.

In one embodiment of the present invention, the fantasy sports contest application may be implemented on an interactive television platform. FIG. 2 shows such an illustrative fantasy sports contest application 200. Main facility 202 may include fantasy sports database 204 and sponsors database 206. Fantasy sports database 204 may include fantasy sports-related information, such as, for example, schedule, draft roster, rules, or any other suitable information relevant to the operation of one or more fantasy sports contests.

Sponsors database 206 may include information related to one or more sponsors of, for example, local, regional, national, international, or any other suitable fantasy sports leagues. Sponsor information may include, for example, sponsor name (e.g., McDonald's Corporation), contest or league type (local, regional, national, etc.), geographical location (e.g., McDonald's on 53$^{rd}$ St., Manhattan, New York City, United States, global, etc.), prizes (e.g., fries, happy meal, cash prize, etc.), or any other suitable sponsor-related information.

Data from main facility 202 may be communicated to television distribution facility 208 over communication link 210. Data files from main facility 202 may be, for example, encapsulated as objects communicated using a suitable Internet based addressing scheme and protocol stack (e.g., a stack using user datagram protocol (UDP) and Internet protocol (IP)).

Communication link 210 may be any suitable communication link for communicating fantasy sports contest data (e.g., contest data, advertisement related data, user data, any other data used in the rotisserie sports contest application, or combination thereof). Communication links 210 may be, for example, a satellite link, a telephone link, a cable or fiber optic link, a microwave link, an Internet link, a combination of such links, or any other suitable communication link. In some arrangements, video signals may be communicated over link 210. In these arrangements, a relatively high bandwidth link such as a satellite link my be preferable to a relatively low bandwidth link such as a telephone line for efficiency.

Television distribution facility 208 may be any suitable facility for communicating television signals to users. Television distribution facility 208 may be, for example, a cable system headend, a broadcast distribution facility, a satellite television distribution facility, or any other suitable facility. Television distribution facility 208 may receive fantasy sports contest data (e.g., rosters, standings, statistical information, or any other suitable data), Sponsor-related data (e.g., sponsor name, contest type, geographical location, prizes, or any other suitable sponsor-related information), and any other suitable data from main facility 202. Television distribution facility 208 of some embodiments of the present invention may also receive sponsor-related data from facilities that are similar to but separate from main facility 202 such as external facility 212. External facility may be any suitable facility for providing sponsor-related data from sponsors database 216 to main facility 202 for localization and communication.

Regardless of the data source, fantasy sports contest data and sponsor-related data may be maintained on server 218 within television distribution facility 208 if desired. Server 218 may be capable of handling text, graphics, video, and providing interactive services such as, for example, handling product and service order, user tracking, or any other suitable interactive service. Server 218 may be based on one or more computers.

Television distribution facility 208 may provide fantasy sports contest data, sponsor-related data, advertisement data, user data, and any other suitable data to user television equipment 222 via communication link 220. Data may be communicated by television distribution facility 208 using a variety of techniques. For example, text and graphics may be communicated over an out-of-band channel using an out-of-band modulator, while large quantity of video may be communicated using one or more digital channels for better efficiency. If desired, text and graphics may also be communicated using digital channels.

Communications link 220 may be any communications link suitable for communicating fantasy sports contest-related information. Communications link 220 preferably have sufficient bandwidth to allow television distribution facility 208 to communicate scheduled television programming, pay programming, advertising and promotional videos, play information, graphics, animated video, and any other suitable data to user television equipment 222. Communications paths 220 may be, for example, a satellite link, a telephone network link, a cable or fiber optic link, a microwave link, an Internet link, a data-over-cable service interface specification (DOCSIS) link, a combination of such links, or any other suitable communication link. There are typically multiple pieces of user television equipment 222 and multiple associated communications link 220, although only one of each are shown in FIG. 2 to avoid over-complicating the drawing. If desired, fantasy sports contest data, advertisement data, or any other suitable data may be communicated by one or more distribution facilities that are similar to, but separate, from television distribution facility 208 using one or more communications links that are separate from communications link 220 (e.g., using Internet links).

User television equipment 222 may include a receiver such as, for example, set-top box 224 or any other suitable television or computer equipment into which circuitry similar to set-top box circuitry has been integrated. For clarity, the present invention is described primarily in the context of user television equipment including a set-top box. However, it should be apparent to those skilled in the art that the fantasy sports contest application may be implemented using user television equipment 222 that is based on, for example, a personal computer, a WebTV box, a personal computer television (PC/TV), a handheld computing device, or any other suitable equipment. In some embodiments, fantasy sports contest application may be implemented using a client-server setup, where user television equipment 222 may be a client processor and one or more servers such as server 218 may act as the server processor.

Fantasy sports contest data, sponsor-related data, advertisement data, and other related data may be communicated to set-top box 224 periodically (e.g., once per hour, once per day, etc.), continuously, or on-demand. Data may also be transmitted from set-top box 224 to television distribution facility 208 for processing. Such data may include, for example, requests for certain fantasy sports contest data, submitted data (e.g., registration for a local award league, etc.), or any other suitable data. Television distribution facility 208 may process such data and take appropriate action such as store registration information (e.g., on server 218), provide the user with information about a contest, or perform any other suitable action.

If desired, certain functions such as a user's instructions to make a change in his roster may be transmitted by set-top box 224 over separate communications links to facilities separate from television distribution facility 208 (e.g., main facility 202) for processing. In these embodiments, some of the communication involving set-top box 224 may be made directly with the separate facility.

Each set-top box 224 may include a processor to handle tasks associated with implementing a fantasy sports contest application on set-top box 224. Television distribution facility 208 may include a processor for handling tasks associated with the communication of fantasy sports contest data, sponsor-related data, or any other suitable data.

Fantasy sports contest data and sponsor-related data received from television distribution facility 208 by set-top box 224 may be displayed for the user on display 226. One or more remote controls such as remote control 228 may be used to control Set-top box 224 and display 226. Alternatively, user input devices such as, for example, wireless keyboards, mice, trackballs, or any other suitable input devices may be used to communicate with set-top box 224 and display 226 in place of remote control 228.

Figure 3:
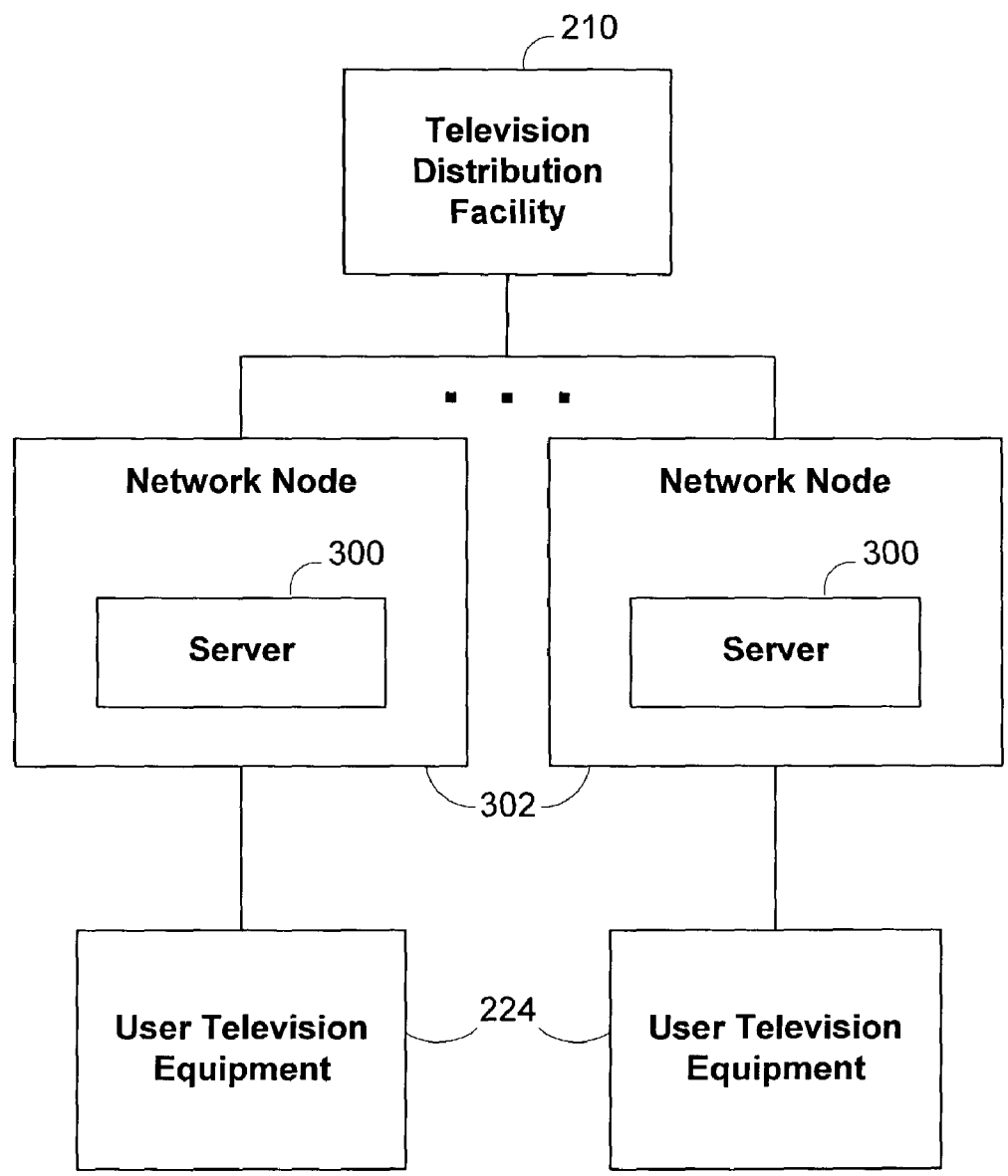
FIG. 3 is a schematic diagram of an illustrative fantasy sports contest interactive television system having network nodes in accordance with one embodiment of the present invention.

FIG. 3 shows an alternative arrangement for communicating data from television distribution facility 210. Server 218 (FIG. 2) residing at television distribution facility 208 may be replaced by or used in conjunction with servers 300 located at network nodes 302. Fantasy sports contest data and sponsor-related data may be downloaded periodically (e.g., once per hour, once per day, etc.) or continuously in a looping arrangement from servers 300 and stored locally. When a looping arrangement is implemented, a map may be provided periodically to indicate the location of the most recent information. Fantasy sports contest application implemented using set-top box 224 (FIG. 2) may access downloaded sponsor-related data locally when needed and use the map to locate the most recent downloaded information on the digital channels.

In another suitable arrangement, server 218 (FIG. 2) or servers 300 (FIG. 3) may be used separately or in conjunction to provide sponsor-related data upon request. If desired, server 218 or servers 300 may provide instructions to set-top box 224 (FIG. 2) informing the location of the sponsor-related data on a particular digital channel. Sponsor-related data may be communicated to set-top box 224 along with fantasy sports contest data. A cable modem may be used to communicate texts, graphics, and videos. Sponsor-related information may be communicated using a combination of these techniques or any other suitable technique.

The fantasy sports contest application may be any suitable software, hardware, or both that may be used to implement the features of the present invention. The fantasy sports contest application may be implemented at any suitable location in system 100 of FIG. 1. For example, the fantasy sports contest application may be implemented at user equipment 116, at server 102, at any other suitable location (that is not necessarily shown in system 100), or at any combination thereof.

The fantasy sports contest application may also be implemented at any suitable location in system 200 of FIG. 2. For example, the fantasy sports contest application may be implemented at television distribution facility 210, at main facility 202, at any other suitable location (that is not necessarily shown in system 200), or at any combination thereof. For example, in system 200 of FIG. 2, certain portions of the fantasy sports contest application may be implemented at user equipment 222, (e.g., those portions that implement features involved in user interaction), whereas certain other portions of the fantasy sports contest application may be implemented at television distribution facility 208 (e.g., those portions that implement features involved in the processing of client requests and in the tracking of the performance of users). Any such suitable arrangement of the fantasy sports contest application may be implemented in accordance with the present invention.

The present invention is primarily described herein in terms of the fantasy sports contest application. It will be understood that any other suitable software, hardware, or both may be used in conjunction with the fantasy sports contest application or in place of the fantasy sports contest application to implement some or all of the features of the present invention.

Aspects of the operation of fantasy sports contest applications are described in U.S. Pat. Nos. 4,918,603 (Hughes, et al.), 5,846,132 (Junkin), 5,971,854 (Junkin), and 6,193,610 (Junkin), which are all hereby incorporated by reference herein in their entireties.

In some embodiment of the present invention, the fantasy sports contest application may create award leagues that are associated with one or more sponsors to provide multi-level fantasy sports contests. Award leagues may be any suitable fantasy sports leagues having one or more sponsors that offer rewards or some other form of recognition to users who compete within the league. The fantasy sports contest application may create award leagues at all levels, for example, focusing on various geographical units (e.g., New York City, Brooklyn, Calif., etc.), focusing on users with particular characteristics (e.g., age, sex, ethnic background, etc.), focusing on users preferred by one or more sponsors of the league (e.g., McDonald's customers, X company employees, etc.), focusing on any other suitable criteria, or focusing on any combination thereof.

For example, the fantasy sports contest application may create a local football award league for a community sports bar and restaurant to allow customers who regularly watch Monday Night Football at the establishment to participate in the league. The restaurant may offer incentives such as a free drink to all participants of the league on Monday night and may offer additional prizes to the winners (e.g., a free dinner for two). This particular award league may benefit the restaurant owner by maintaining an existing customer base and attracting new customers while the award league may also benefit fantasy sports users who frequent the restaurant by providing a friendly environment to enjoy the game and compete.

As another example, the fantasy sports contest application may allow the McDonald's Corporation to create numerous local award leagues, multiple regional award leagues, multiple national award leagues, and an international award league to allow McDonald's customers all over the world to participate in one or more McDonald's award leagues (e.g., a World Cup Soccer League). Each local McDonald's restaurant may sponsor a local award league for its customers. Above these local award leagues, McDonald's headquarters in various countries may sponsor regional and national leagues that are accessible by customers in the appropriate geographical area. The international award league may be, for example, sponsored by the McDonald's Corporation headquarters and may be open to all McDonald's customers. The fantasy sports contest application may allow the user to simultaneously participate in McDonald's local, regional, national, and international award leagues at the same time and may award prizes to the user based on, for example, weekly scores, leaderboard standings, or any other suitable criteria. The fantasy sports contest application may direct the user to redeem the prizes, for example, at the local McDonald's restaurant, through mail, or using any other suitable approach, based on preferences of McDonald's Corporation.

Figure 4:
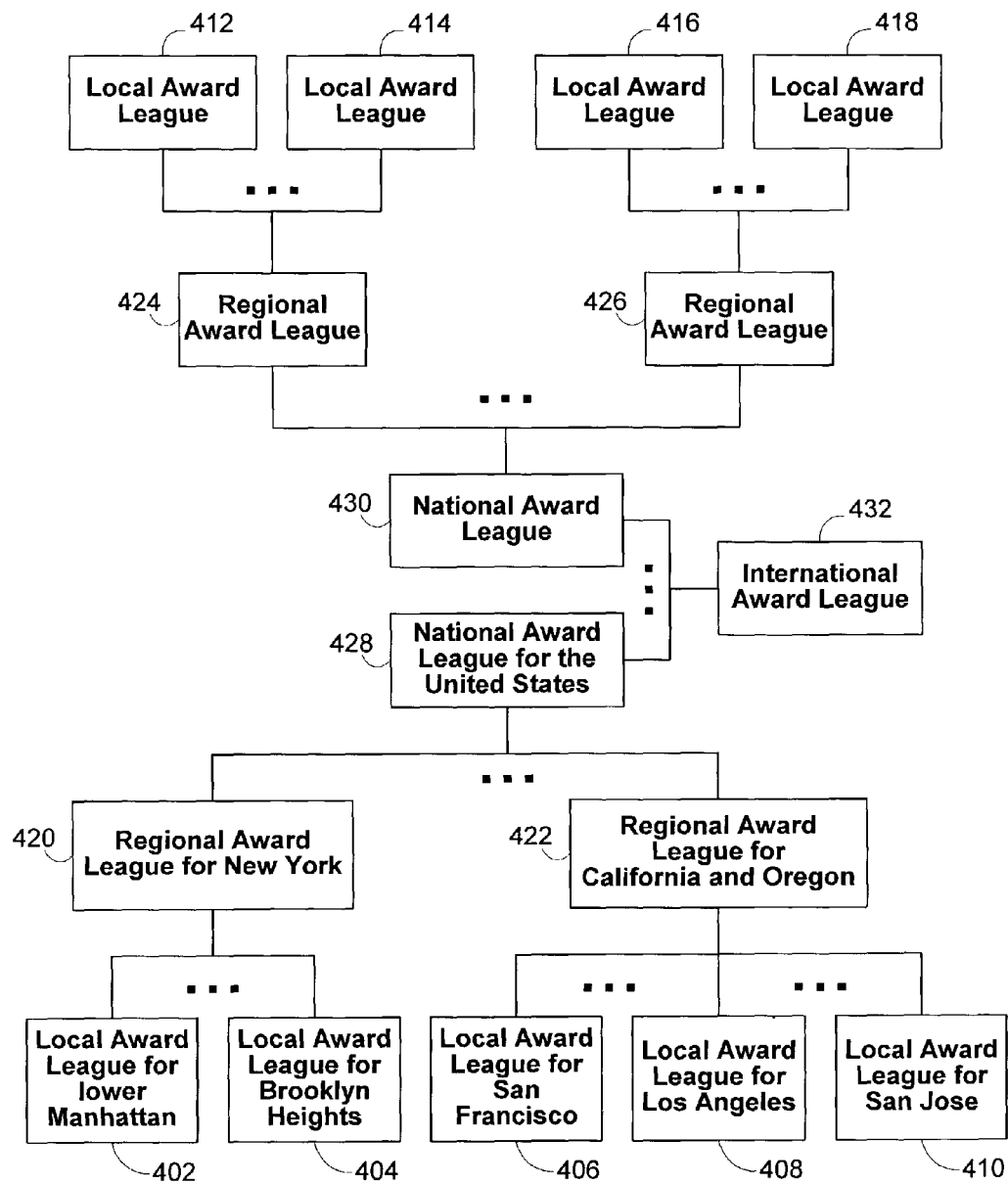
FIG. 4 is a schematic diagram of an illustrative fantasy sports contest award league network associated with a particular sponsor in accordance with one embodiment of the present invention.

FIG. 4 shows a schematic diagram of an illustrative fantasy sports contest award league network associated with a particular sponsor (e.g., McDonald's) in accordance with one embodiment of the present invention. The fantasy sports contest award league network may include one or more award leagues associated with the sponsor that are arranged in any relationship that is specified by the sponsor. In this example, the fantasy sports contest application has enabled the sponsor to create various award leagues that are geographically focused and associate with each other through geographical relationships. The fantasy sports contest application may, for example, allow only users residing in a particular geographical area specified by a local award league to participate in that local award league. In this example, geographical areas associated with local award leagues are only shown for local award leagues 402-410 to avoid over-complicating the drawing.

The fantasy sports contest application may create local award league 406 to allow users within a broad geographical area such as San Francisco to participate in local award league 406. The fantasy sports contest application may also create a local award league 402 that allows users within a less broad geographical area such as lower Manhattan to participate in the local award league. The fantasy sports contest application may create such differences in the size of the geographical area based on, for example, the number of users that are interested in participating in the local award league in each area, the number of affiliates associated with the sponsor in each area, any other suitable criteria, or any combination thereof.

In this example, the fantasy sports contest application has created numerous regional award leagues 420-426 to allow at least some of the users in one or more local award leagues to participate in a regional award league. Similarly, the fantasy sports contest application has also created multiple national award leagues 428 and 430 and an international league 432 to allow at least some of the users in the respective geographical areas to participate in the broader award leagues. Specific geographical areas associated these leagues are only shown for regional award leagues 420 and 422 and for national award league to avoid over-complicating the drawing.

The fantasy sports contest application may allow the user to participate in one or more award leagues of different geographical levels as long as the user resides in the area that is covered by the geographical area associated with the particular award league. For example, the fantasy sports contest application may allow a user living in lower Manhattan to participate in local award league for lower Manhattan 402, regional award league for New York 420, national award league for the United States 428, and international award league 432.

It will be understood that the fantasy sports contest application may create any other suitable fantasy sports contest award league network in addition to or in place of the fantasy sports contest award league network discussed above to suit the needs of the sponsors and users.

In some embodiments of the present invention, the fantasy sports contest application may allow the user to access a specific award league using a unique award league code. The award league code may be any combination of numbers, letters, or any other suitable character that may uniquely identify an award league within the fantasy sports contest application. A user may obtain the award league code for access a particular award league by, for example, purchasing products from the sponsor of the league and receiving the code on the receipt, obtaining the award league code from the sponsor's advertisement in the local newspaper, or using any other suitable approach.

Figure 5:
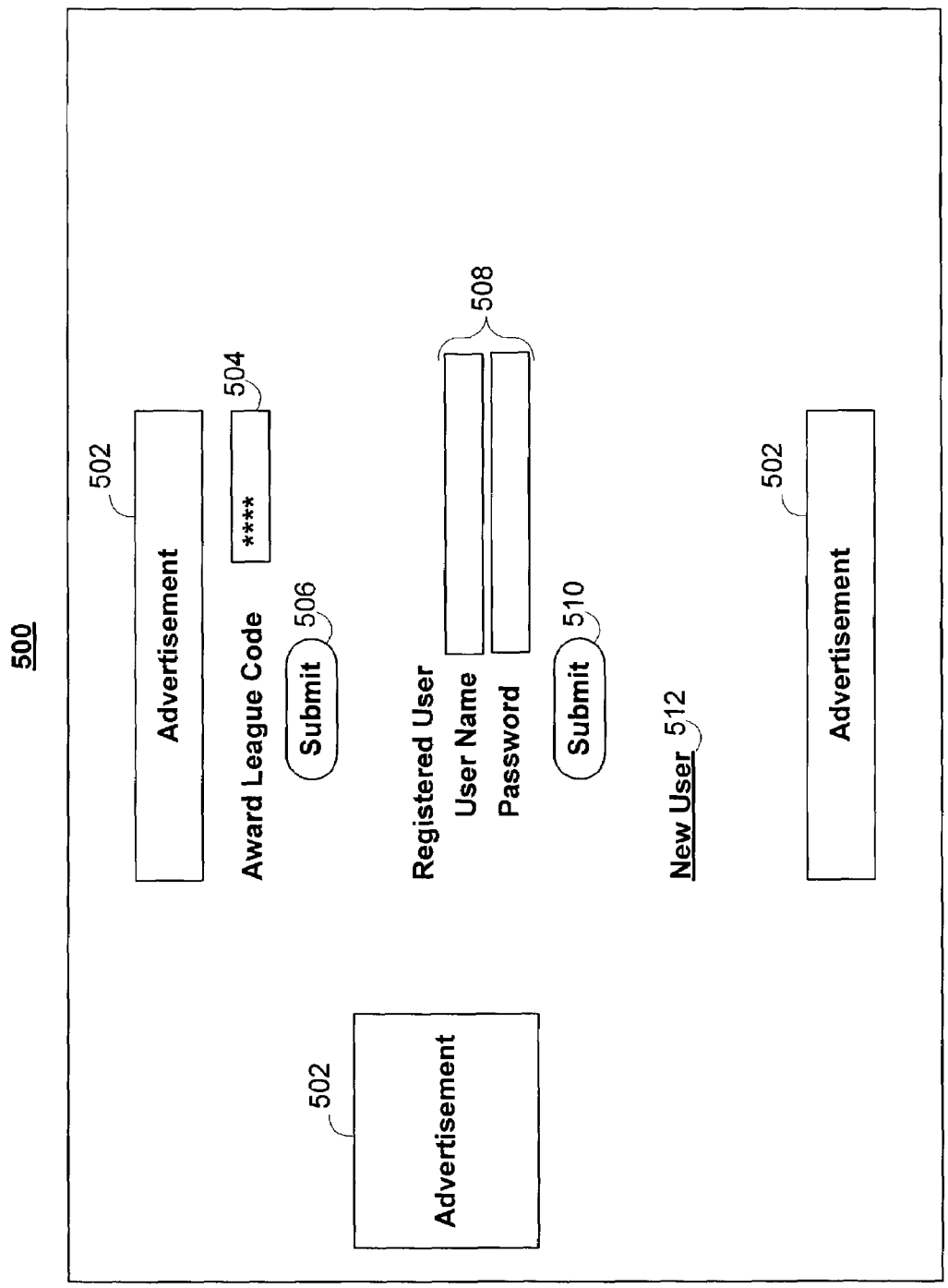
FIG. 5 is an illustrative fantasy sports contest login screen in accordance with one embodiment of the present invention.

FIG. 5 shows an illustrative fantasy sports contest login 500 in accordance with one embodiment of the present invention in which the user may search for a particular award league using an award league code. Screen 500 may include one or more advertisements 502 and various login or search information. Advertisements 502 may also be sent to the user, for example, via email, via phone, or any other suitable communication channel. In this example, the fantasy sports contest application may allow the user to search for a specific award league by entering the corresponding award league code in field 504 and submit the entered code using submit button 506.

In other suitable embodiments of the present invention, the fantasy sports contest application may allow the user to select the code from a drop down list, or type in the name of the sponsor, or using any other suitable approach to search for the award league.

The fantasy sports contest application may allow a registered user to log into one or more fantasy sports contests through the fantasy sports contest application by supplying appropriate user name and password in login area 508 and to submit the information using submit button 510. The fantasy sports contest application may allow a new user to request for additional information tailored to new users (e.g., registration information) by, for example, selecting link 512.

Fantasy sports contest login screen 500 is merely illustrative of such a display screen. Various other suitable arrangements may be used. For example, in another suitable arrangement, the fantasy sports contest application may display new user registration information on screen 500, the fantasy sports contest application may provide a link for registered user to access login information in a separate screen, or any other suitable screen may be displayed.

Figure 6:
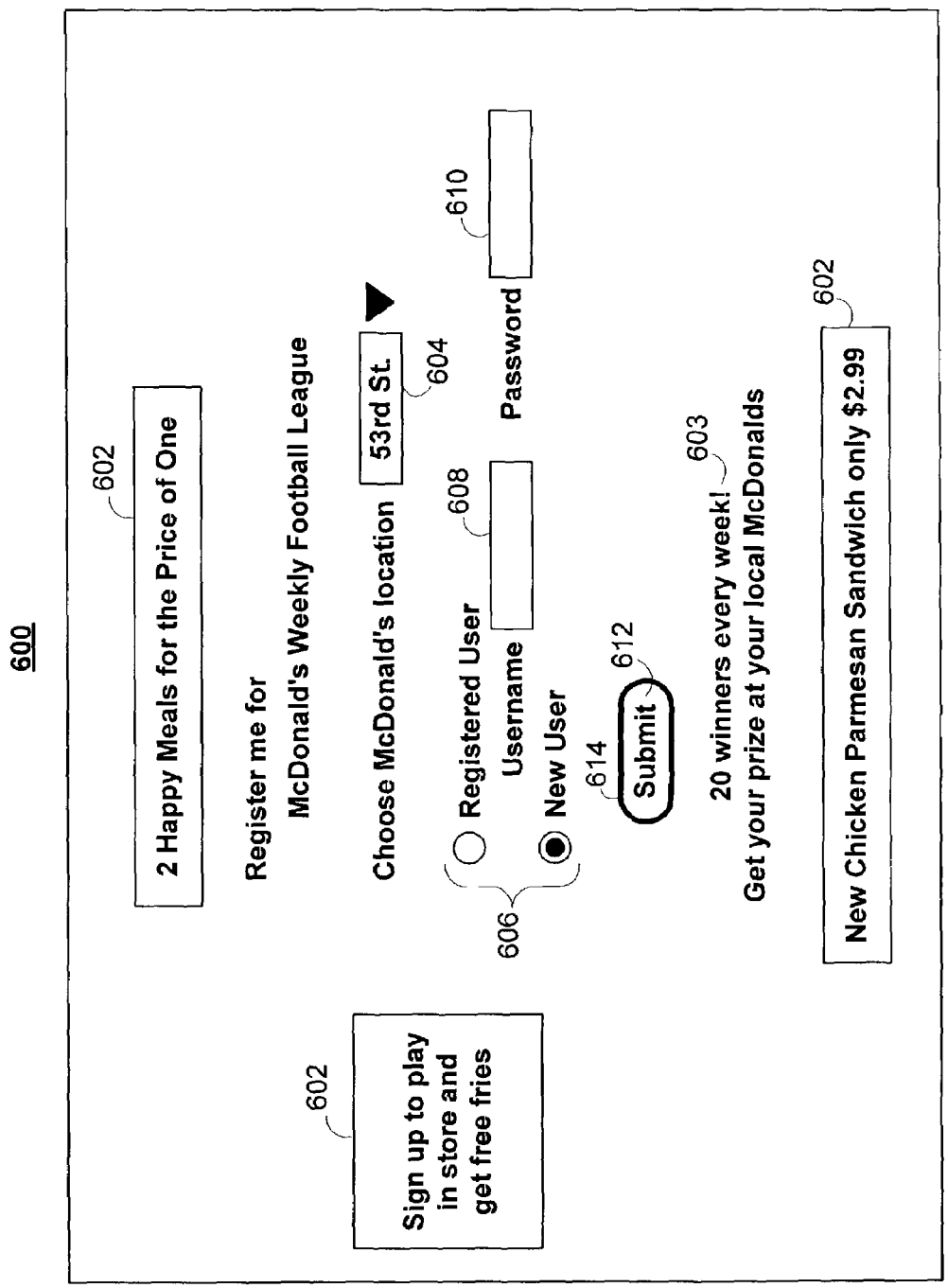
FIG. 6 is an illustrative fantasy sports contest award league registration screen in accordance with one embodiment of the present invention.

FIG. 6 shows an illustrative fantasy sports contest award league registration screen 600 in accordance with one embodiment of the present invention. Screen 600 may include various advertisements 602 promoting products or services related to the sponsor of the league, one or more announcements 603 from the sponsor, and award league registration information. In an alternative arrangement, advertisements 602 may be used to promote any other suitable product, service, or both. Advertisements 602 may also be sent to the user, for example, via email, via phone, or any other suitable communication channel. In this example, screen 600 includes registration information for the McDonald's weekly football league.

The fantasy sports contest application may allow the user to choose a McDonald's location that is, for example, most convenient for the user to redeem any prize that might be won in the fantasy sports contest award league contest, from drop down menu 604. The user may also indicate whether the user has previously completed registration to participate in fantasy sports contests by selecting radio buttons in area 606. If the user has previous registered, the fantasy sports contest application may allow the user to supply a user name and corresponding password in fields 608 and 610, respectively, to login. Otherwise, the fantasy sports contest application may allow the user to select the radio button associated with a new user. The user may use submit button 612 to transmit the information to the fantasy sports contest application for processing. The fantasy sports contest application may display highlight region 614 to indicate that the user has currently selected submit button 612.

The fantasy sports contest application may allow the user to select from dropdown menu 604, indicate registration status with radio button in area 606, and highlight submit button 612 by, for example, using the up or down buttons on a remote control to position highlight region 614 over the appropriate region and pressing a select or enter button to select the option, using a mouse to click on suitable regions and buttons, or using any other suitable approach.

Fantasy sports contest award league registration screen 600 is merely illustrative of such a display screen. Various other arrangements may be used.

FIG. 7 shows an illustrative fantasy sports user registration screen 700 in accordance with one embodiment of the present invention. The contest application may show screen 700 in response to the user indicating new user status (e.g., in area 606 of FIG. 6) and then selecting submit button 614 (FIG. 6). Screen 700 may include various advertisements 702 promoting the products and services associated with the sponsor of the award league and a user registration form. In an alternative arrangement, advertisements 702 may be used to promote any other suitable product, service, or both. Advertisements 702 may also be sent to the user, for example, via email, via phone, or any other suitable communication channel.

The fantasy sports contest application may allow the user to enter registration information such as, for example, name, age, sex, user name, password, or any other suitable user information into the registration form. The user may use submit button 704 to submit the user registration information to the fantasy sports contest application for processing.

Fantasy sports user registration screen 700 is merely illustrative of such a display screen. Various other arrangements may be used.

In some embodiments of the present invention, the fantasy sports contest application may allow the user to access a specific award league in a fantasy sports contest application using a terminal located at the sponsor's physical location. A terminal may be any combination of hardware and software that may be suitable for implementing at least a part of a fantasy sports contest application to receive and transmit user-related data (e.g., user registration data for the award league). A terminal may be, for example, a personal computer, a webTV, or any other suitable equipment. A sponsor may install one or more of such terminals in one or more of its locations, in which customers may access one or more of the sponsor's award leagues (e.g., a specific award league created for customers of a particular restaurant associated with a restaurant chain).

Referring to FIG. 1, the terminal may, for example, take the place of user equipment 116. The terminal may include processing equipment 118 for receiving and transmitting fantasy sports contest data. The user may interact with processing equipment 118 using input device 120 such as a remote control, a keyboard, a voice-recognition device, a track ball, a mouse, any other suitable device, or any combination thereof.

Fantasy sports contest data received by processing equipment 118 may be displayed for the user on display equipment 122. Display equipment 122 may be, for example, a television, a monitor, or any other suitable display equipment. Audio information generated by processing equipment 118 may be played for the user using audio equipment 124 (e.g., speakers). Audio equipment 124 may be a stand-alone equipment or integrated with display equipment 122.

Referring to FIG. 2, the terminal may, for example, take the place of user television equipment 222. User television equipment 222 may include a receiver such as, for example, set-top box 224 or any other suitable television or computer equipment into which circuitry similar to set-top box circuitry has been integrated. The terminal may also be based on, for example, a personal computer, a WebTV box, a personal computer television (PC/TV), a handheld computing device, or any other suitable equipment.

Each terminal may include a processor to handle tasks associated with implementing a fantasy sports contest application on set-top box 224. Fantasy sports contest data and sponsor-related data received from television distribution facility 208 by set-top box 224 may be displayed for the user on display 226. One or more remote controls such as remote control 228 may be used to control Set-top box 224 and display 226. Alternatively, user input devices such as, for example, wireless keyboards, mice, trackballs, or any other suitable input devices may be used to communicate with set-top box 224 and display 226 in place of remote control 228.

In some embodiments of the present invention, the fantasy sports contest application may eliminate certain restrictions that are often associated with fantasy sports contests in order to, for example, allow more users to participate in a contest, to minimize the difficulties associated with participating in multiple fantasy sports contests, or to eliminate any other obstacle associated with participating in fantasy sports contests.

Figure 8:
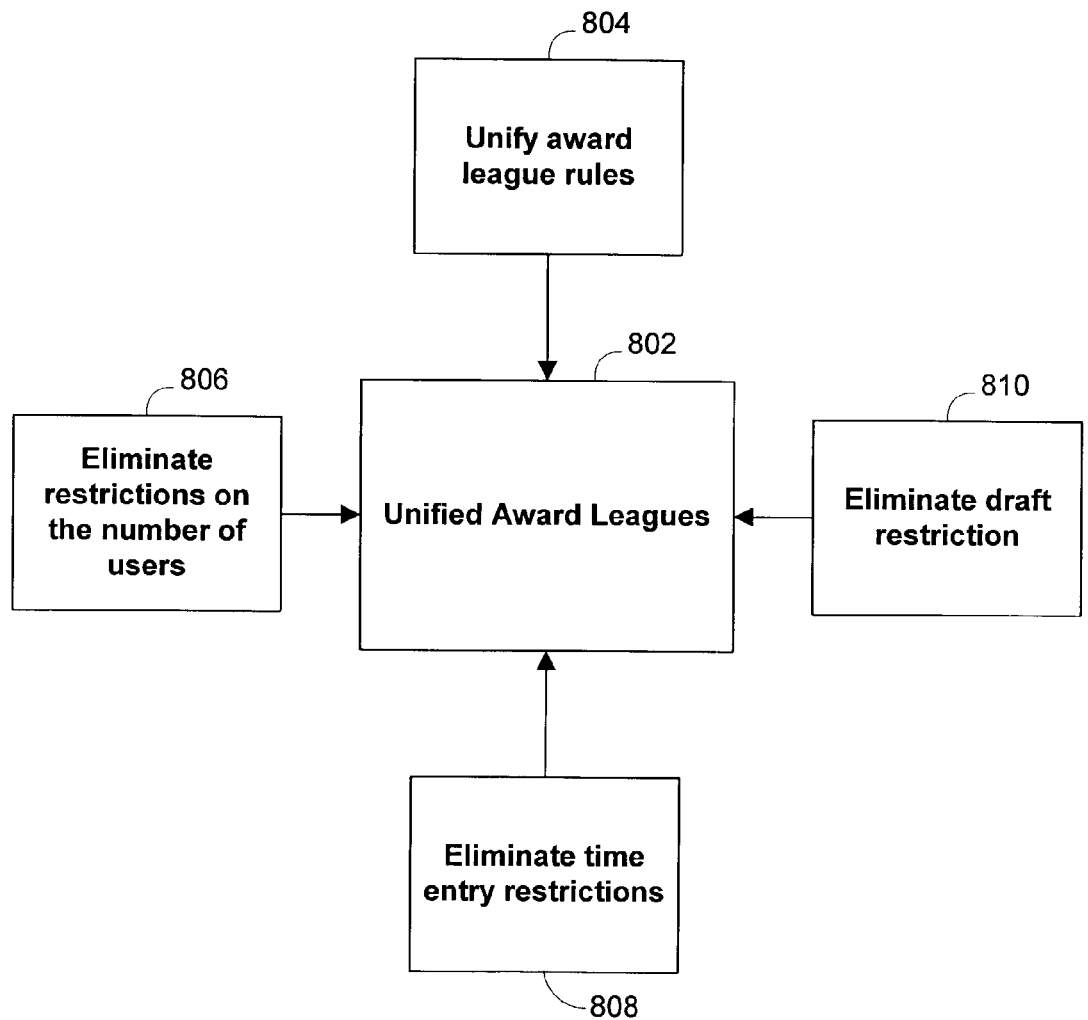
FIG. 8 is a schematic diagram of a fantasy sport contest award league in which a number of restrictions have been eliminated or otherwise addressed in accordance with one embodiment of the present invention.

FIG. 8 shows a schematic diagram of such a fantasy sport contest award league in which a number of restrictions have been eliminated or otherwise addressed in accordance with one embodiment of the present invention. The ways in which the fantasy sports contest application may eliminate or otherwise address each of the restrictions 804-810 will be discussed in detail in the following sections.

In some embodiments of the present invention, the fantasy sports contest application may allow the user to enter the same team (e.g., football team, basketball team, volleyball team, baseball team, etc.) or roster to compete in more than one award leagues. In these embodiments, the fantasy sports contest application may unify the rules of the various award leagues to eliminate the many obstacles that the user may normally face in attempting to enter the same team into multiple leagues (Step 804).

For example, many different scoring system are implemented in known fantasy sports football leagues, making two leagues as different as the NFL and the CFL. Some leagues may, for example, award six points to any athlete who scores a touchdown regardless of whether it was from rushing, passing or receiving. In these leagues, both the quarterback and the wide receiver receive six points for completing a touchdown pass, making it ideal to have both an excellent quarterback and an exceptional wide receiver (e.g., Brett Favre and Antonio Freeman) on the same team. Other leagues may, for example, split the six points for a touchdown between the quarterback and the wide receiver, which may cause the user's draft picks to be drastically different from that of the previous example.

The size of rosters, bonus point systems, defense scoring system, and many other performance measures may also vary from league to league. Therefore, by implementing a uniform set of rules for all award leagues (e.g., all football award leagues have the same rules and all basketball award leagues have the same rules), the fantasy sports contest application allows the user to enter multiple award leagues (in the same sports category), while managing only one team.

In some embodiments of the present invention, the fantasy sport contest application may eliminate restrictions on the number of users that may compete in an award league (Step 806). The fantasy sports contest application may allow the award leagues in these embodiments to accommodate as many users as the sponsors or application providers desire.

In one suitable arrangement, the fantasy sports contest application may implement non-exclusive draft system in award leagues. In doing so, the fantasy sports contest application allows each user to draft from the whole pool of eligible athletes for that sport regardless of the picks made by other users in the league.

For example, the fantasy sports contest application may give the user a certain amount of fictional dollars to spend on drafting athletes for the user's roster in a football award league. The fantasy sports contest application may assign each available football player a fictional dollar value based on, for example, performance from the previous season, statistical value associated with the user, real-life salary, any other suitable approach, or combination thereof. The fantasy sports contest application may then allow the user to exchange a portion of the user's wealth for athletes according to the dollar amount associated with the athlete. This draft system allows the same athlete to be drafted by multiple users, thus the fantasy sports contest application allows unlimited numbers of users to compete in a single award league.

In some embodiments of the present invention, the fantasy sports contest application may allow a user to join an award league at any time during the season (step 808). In these embodiments, the fantasy sports contest application may make all athletes available for draft by the user at any times during the season (step 810). The fantasy sports contest application may produce winners and award prizes in these award leagues on semi-cumulative or non-cumulative bases (e.g., based on weekly scores) to keep the contest challenging to all throughout the season.

The diagram of FIG. 8 merely illustrates some of the ways in which restrictions may be eliminated or addressed in a fantasy sports contest award league. Various other ways may be implemented or otherwise used to eliminate or address suitable restrictions.

In some embodiments of the present invention, the fantasy sports contest application may automatically enter a team previously drafted by the user for a first award league of a particular sport into a second award league of the same sport when the user joins the second league. By doing so, the fantasy sports contest application may force the user to maintain only one team (or a specified number of teams) for all award leagues in the same sports category in order to control the resources dedicated to storing and tracking the user's various rosters. The user may also minimize the time spent on managing various teams.

Figure 9:
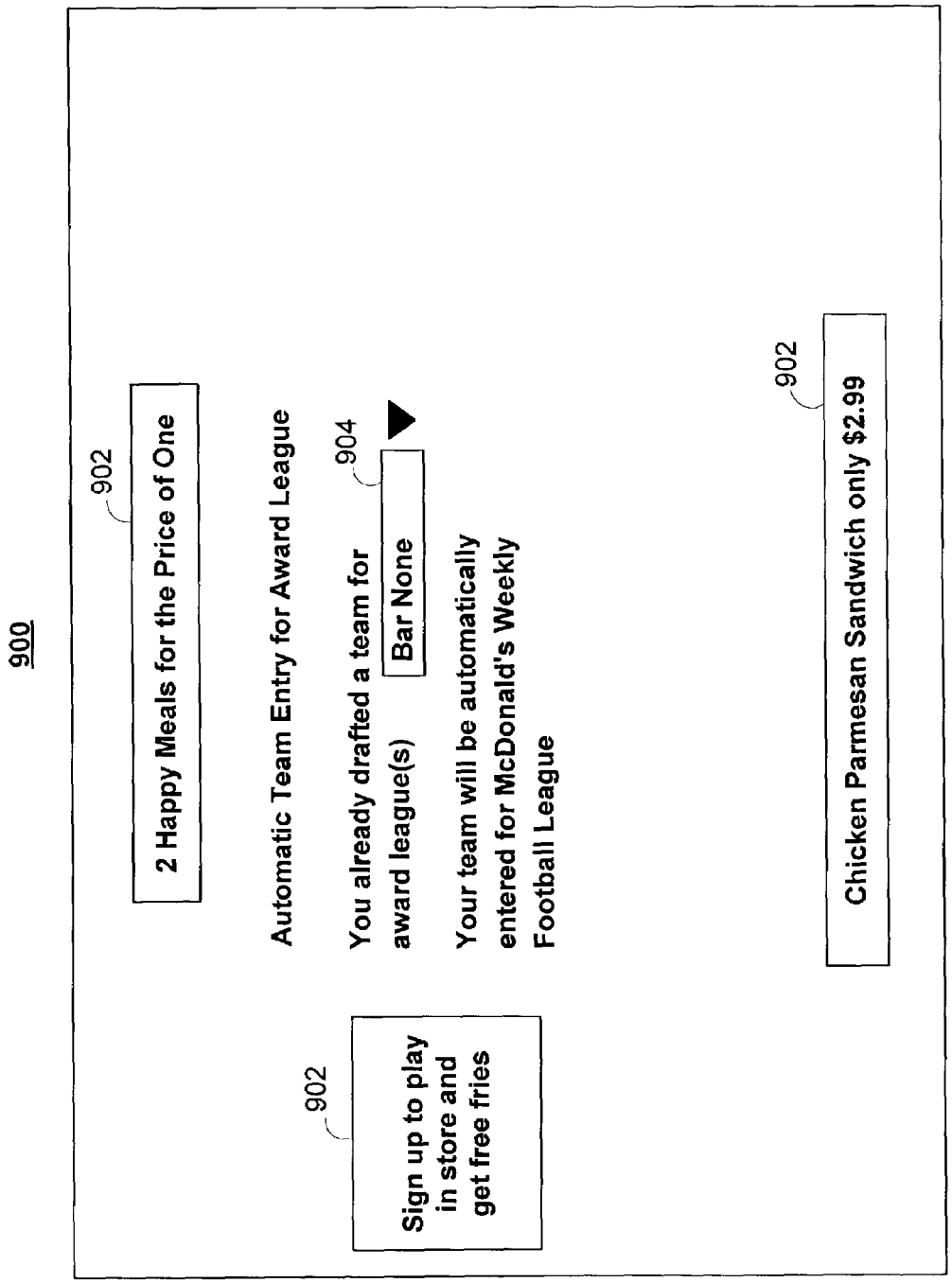
FIG. 9 is an illustrative fantasy sports contest award league automatic team entry screen in accordance with one embodiment of the present invention.

FIG. 9 shows an illustrative fantasy sports contest award league automatic team entry screen 900 in accordance with one embodiment of the present invention. Screen 900 may include various advertisements 902 promoting the products and services associated with the sponsor of the particular league and award league information. Alternatively, advertisements 902 may be used to promote any other suitable product, service, or both. Advertisements 902 may also be sent to the user, for example, via email, via phone, or any other suitable communication channel. The fantasy sports contest award league may show screen 900 in response to the registered user (e.g., as indicated in status region 606 of FIG. 6) joining an award league by, for example, submitting information using submit button 612 of FIG. 6. In this example, Screen 900 displays in drop down menu 904 the various award leagues that the user has participated or is currently participating in as determined by the fantasy sports contest application based on the user name and password submitted by the user, for example, in screen 600 of FIG. 6. Screen 900 also informs the user that a team previously drafted by the user for one of more of those indicated award leagues has been automatically entered into the currently selected award league (e.g., McDonald's Weekly Football league).

Fantasy sports contest award league automatic team entry screen 900 is merely illustrative of such a display screen. Various other arrangements may be used.

In some embodiments of the present invention, the fantasy sports contest application may allow a user who have not previously drafted a team for an award league to select a team from the teams that the user had drafted previously for a non-award league of the same sport. In these embodiments, the fantasy sports contest application may modify a team drafted for another league (e.g., non-award league) according to the rules of the award leagues before the fantasy sports contest application allows the user to enter the team into an award league contest. In some embodiments of the present invention, the fantasy sports contest application may provide the user with an opportunity to review the modified team before entering the team into the fantasy sports contest, thus allowing the user to cancel the team based on the results of the modification.

For example, a non-award league may allow 18 players on the roster, while the uniform rules of the award leagues may only permit each user to draft 15 players. In these embodiments of the present invention, the fantasy sports contest application may remove three benched athletes from the team from the non-award league before the team may be entered into the award league.

Figure 10:
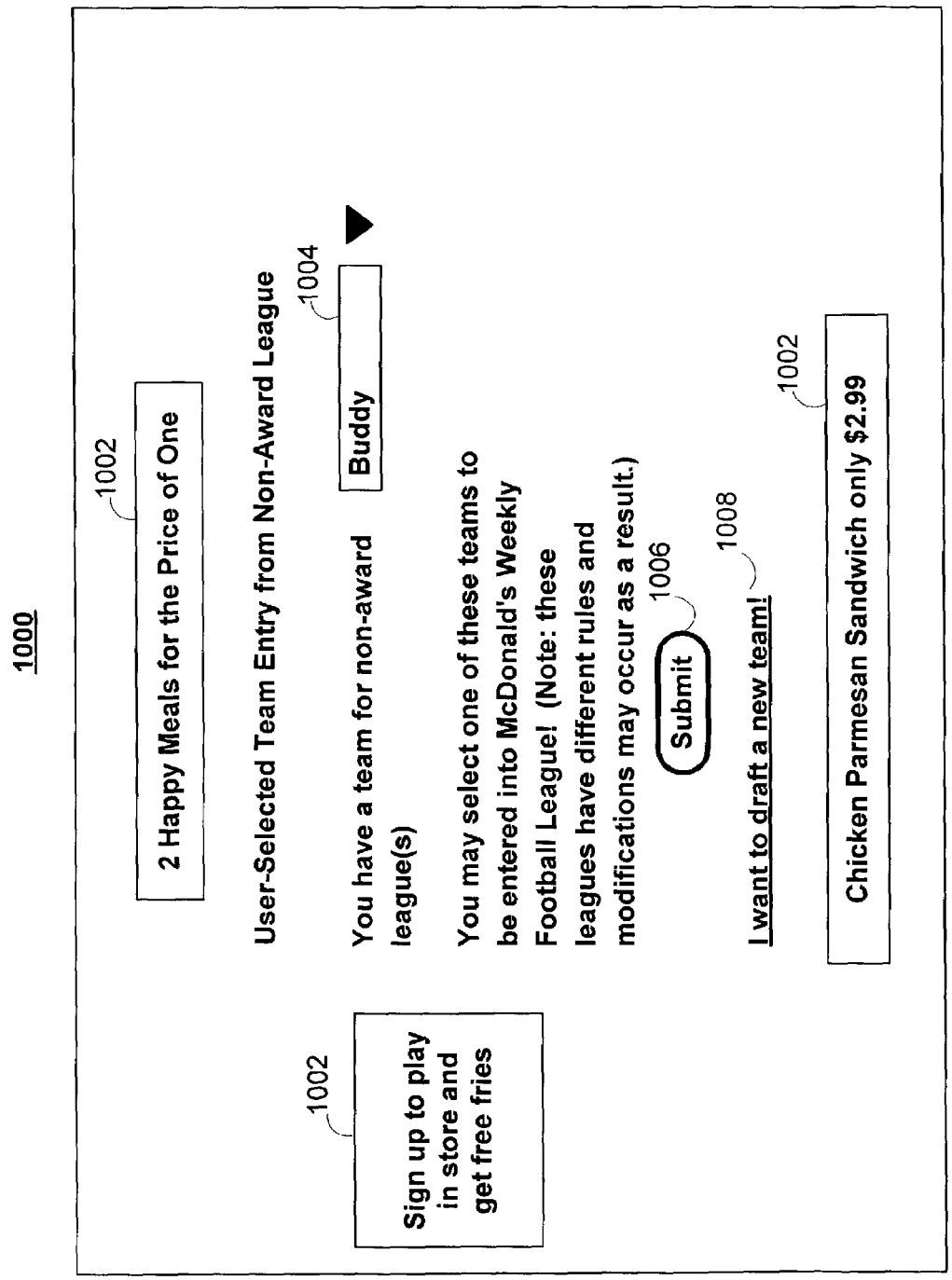
FIG. 10 is an illustrative fantasy sports contest award league team entry from non-award league screen in accordance with one embodiment of the present invention.

FIG. 10 shows an illustrative fantasy sports contest award league team entry from non-award league screen 1000 in accordance with one embodiment of the present invention that may be shown in response to a registered user (e.g., as indicated in area 606 of FIG. 6) selecting submit button 614 (FIG. 6). Screen 1000 may display in dropdown menu 1004 the various non-award leagues of the same sport category, in which the user have drafted teams as determined by the fantasy sports contest application based on the user name and password submitted on screen 600. The fantasy sports contest application may allow the user to select one of these leagues from dropdown menu 1004 and submit the selection using submit button 1006 to enter the team for that league into the currently selected award league (e.g., McDonald's Weekly Football League). In response to receiving such submission from the user, the fantasy sports contest application may evaluate the team according to the rules of the award league and make any necessary modification. Alternatively, the fantasy sports contest application may allow the user to indicate a desire to draft a new team consistent with the rules of the award leagues by, for example, selecting link 1008.

Fantasy sports contest award league team entry from non-award league screen 1000 is merely illustrative of such a display screen. Various other arrangements may be used.

In some embodiments of the present invention, the fantasy sports contest application may allow the user to draft a new team to enter into an award league contest. The user may be a user who has never drafted a team before for any league or a registered user who has declined to select a team from the teams that the user has drafted for non-award leagues. The pool of available athletes in these drafts may be the same for every user.

Figure 11:
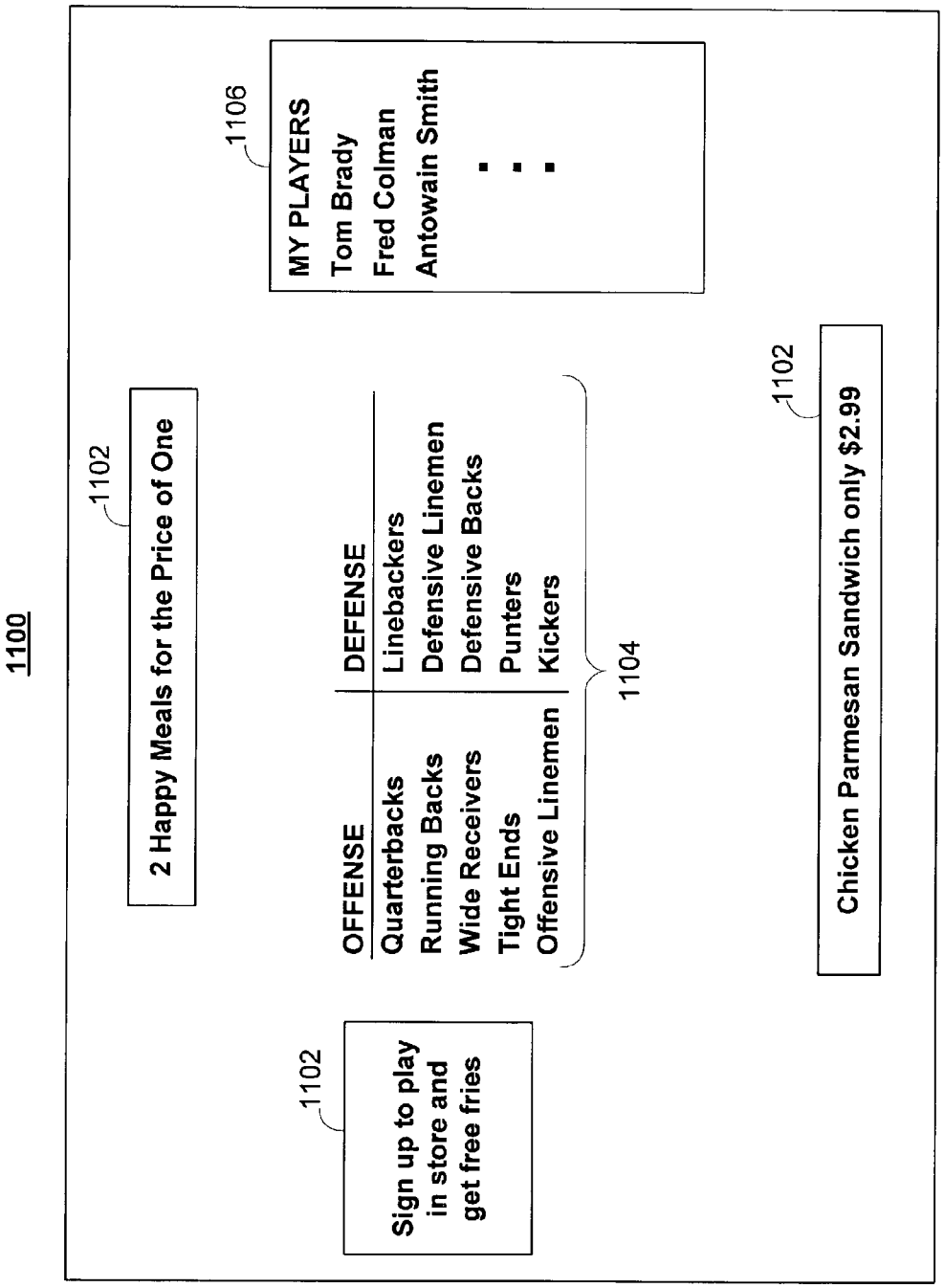
FIG. 11 is an illustrative fantasy sports contest award league draft screen in accordance with one embodiment of the present invention.

FIG. 11 shows an illustrative fantasy sports contest award league draft screen 1100 in accordance with one embodiment of the present invention. The fantasy sports contest application may show screen 1100 in response to a new user submitting user registration information on screen 700 using submit button 704 (FIG. 7). The fantasy sports contest application may also show screen 1100 in response to a registered user selecting link 1008 on screen 1000 of FIG. 10.

Screen 1100 may include various advertisements 1102 promoting products and services associated with the sponsor of the league, athletes available for the draft, and the user's roster. In an alternative arrangement, advertisements 1102 may be used to promote any other suitable product, service, or both. Advertisements 1102 may also be sent to the user, for example, via email, via phone, or any other suitable communication channel. In this example, NFL football players are organized by position in both offensive and defensive categories in grid 1104. Each position listed may be a link that may provide a list of available athletes in that particular position when selected by the user. Screen 1100 may also include a user roster 1106 that reflects athletes currently selected for the user's team. The user may select an athlete for his team by, for example, dragging an athlete's name into region 1106.

Fantasy sports draft screen 1100 is merely illustrative of such a display screen. Various other arrangements may be used.

In some embodiments of the present invention, the fantasy sports contest application may provide a collection of performance information for the user in various award leagues. Performance information may include, for example, weekly score, league names, rankings within the leagues, prizes won, or any other suitable performance information. In these embodiments, the fantasy sports contest application may present the performance information for the user in various award leagues and links associated with information on prizes that the user has won in these leagues on a screen. In response to a user selecting a link, the fantasy sports contest application may provide additional information about the prize to the user. Additional information about the prize may be, for example, additional information about how the user may collect the prize. According to one suitable approach, fantasy sports contest application may present the user with a one time user coupon that may be used to purchase items from the sponsor's store.

Figure 12:
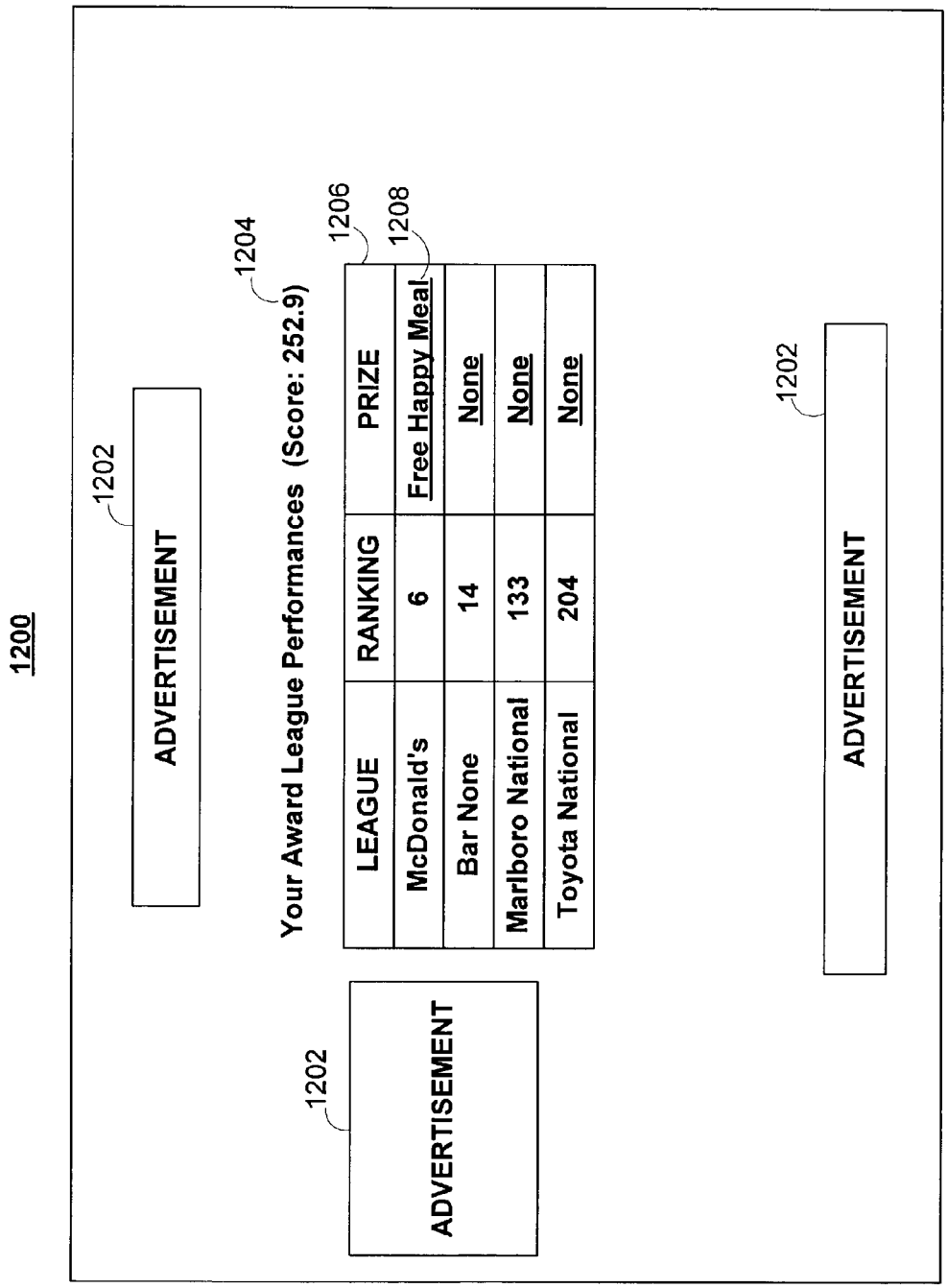
FIG. 12 is an illustrative fantasy sports contest award league scoreboard screen in accordance with one embodiment of the present invention.

FIG. 12 shows an illustrative fantasy sports contest award league scoreboard screen 1200 in accordance with one embodiment of the present invention. Screen 1200 may include one or more advertisements 1202 and the user's performance information in all the award leagues for a particular sports category that the user competes in. Advertisements 1202 may also be sent to the user, for example, via email, via phone, or any other suitable communication channel. Because the fantasy sports contest application may implement uniform rules across all award leagues in the same sports category, the score for the user's performance may the same for all award leagues. In this example, the fantasy sports contest application shows that the user has scored 252.9 points according to fantasy football scoring rules (score 1204).

The fantasy sports contest application may show the user's ranking and prize related information in various award leagues based on this score in scoreboard grid 1206. In this example, the user participates in four football award leagues, two of which are local leagues and the other two of which are national leagues. The user has won one prize 1208 based on score 1204. Prize 1208 may be a link that may provide additional information about the prize when selected by the user.

Fantasy sports contest award league scoreboard screen 1200 is merely illustrative of such a display screen. Various other arrangements may be used.

In some embodiments of the present invention, the fantasy sports contest application may provide the user with an electronic receipt for collecting a prize won in an award league. The fantasy sports contest application may generate the receipt in response to, for example, a user selecting a link associated with a prize won in an award league. The fantasy sports contest application may provide, for example, a confirmation code on the receipt, to ensure that the receipt is legitimate and to prevent the user from claiming the prize more than once. A user may print the receipt to collect the prize, for example, from the sponsor's store.

Figure 13:
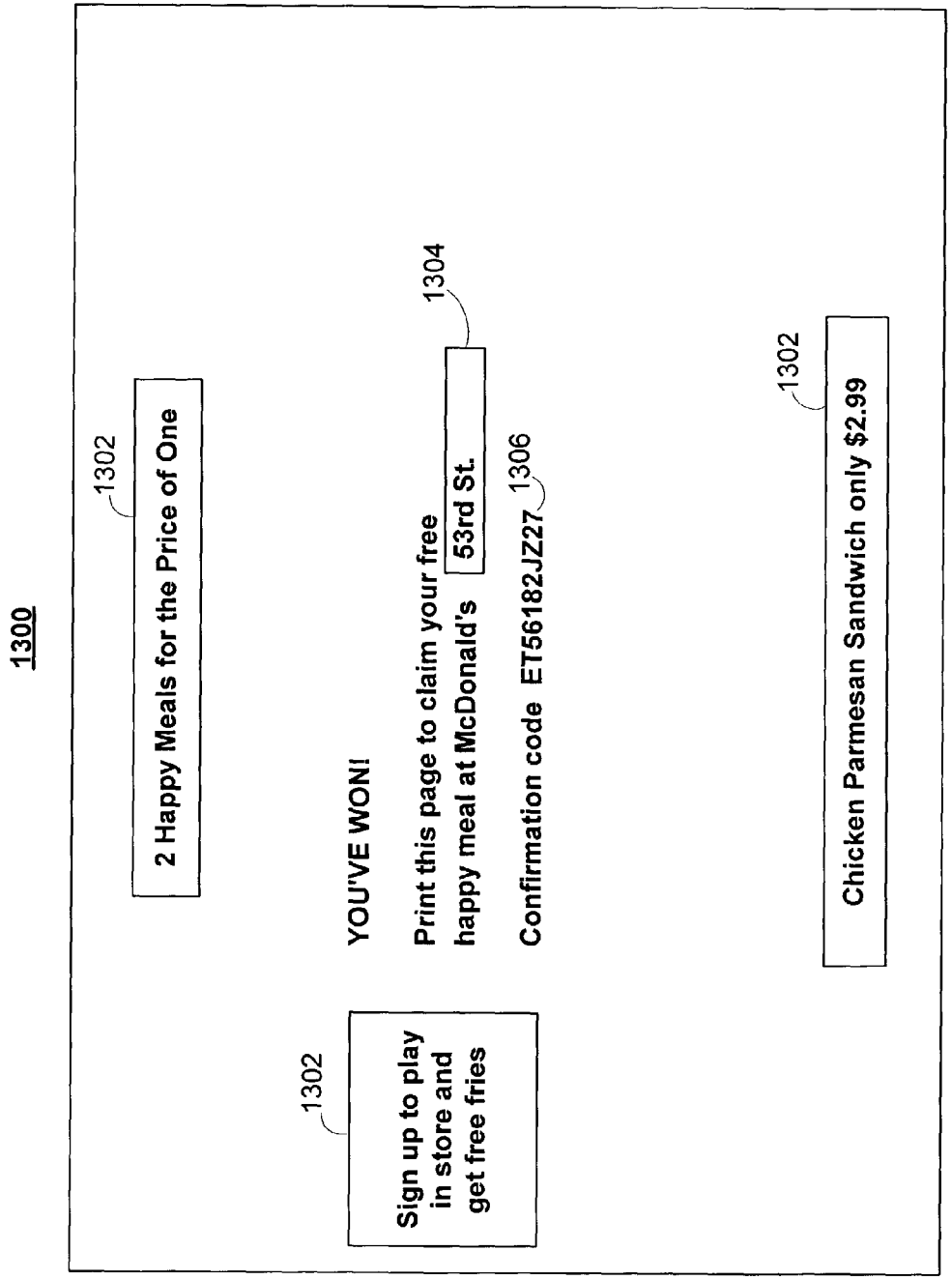
FIG. 13 is an illustrative fantasy sports contest award league prize receipt screen in accordance with one embodiment of the present invention.

FIG. 13 shows an illustrative fantasy sports contest award league prize receipt screen 1300 in accordance with one embodiment of the present invention. The fantasy sports contest award league may show screen 1300 in response to the user selecting prize 1308 (FIG. 10). Screen 1300 may include various advertisements 1302 promoting the products and services associated with the sponsor of the league and prize information. In this example, the fantasy sports contest application displays prize information regarding how to collect the prize associated with link 1208 of FIG. 12. The fantasy sports contest application may show the various locations for claiming the prize in dropdown menu 1304. The fantasy sports contest application may also display a confirmation code specific to the user and the prize on the receipt to ensure that only the correct user may claim the prize and may only be able to claim the prize once.

Fantasy sports contest award league prize receipt screen 1300 is merely illustrative of such a display screen. Various other arrangements may be used.

Figure 14:
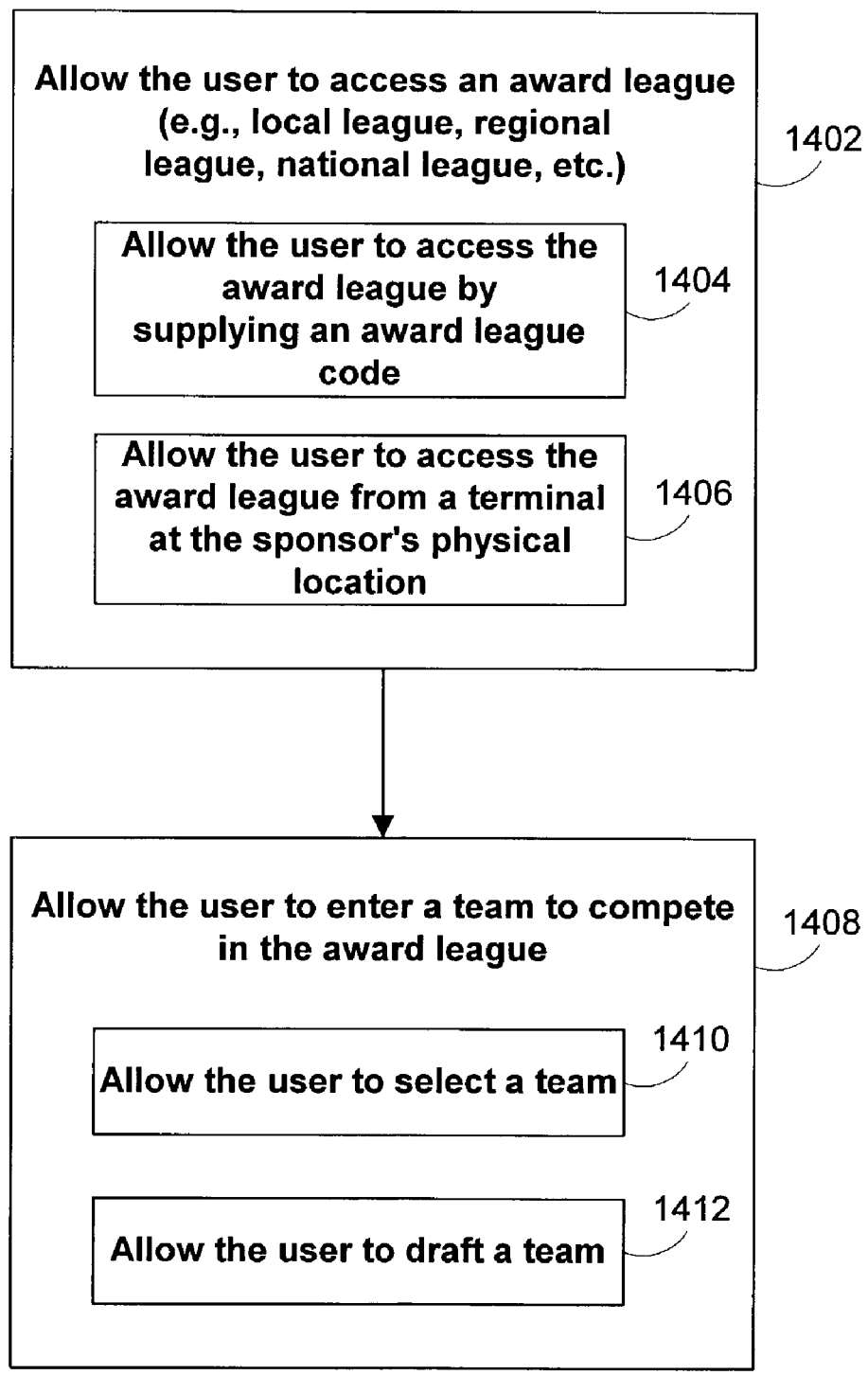
FIG. 14 is a flow chart of illustrative steps involved in entering a fantasy sports contest award league contest in accordance with one embodiment of the present invention.

FIG. 14 shows a flow chart of illustrative steps involved in entering an award league contest in accordance with one embodiment of the present invention. At step 1402, the fantasy sports contest application may allow the user to access an award league. The award league may be, for example, a local league sponsored by a neighborhood grocery store, a local league that is a part of multiple local leagues sponsored by the same sponsor (e.g., McDonald's), a regional league, a national league, an international league, or a any other suitable award league).

In one suitable arrangement, the fantasy sports contest application may allow the user to access the award league at step 1404 by, for example, using an award league code to search for the league within the fantasy sports contest application as shown in FIG. 5. The user may obtain the code by, for example, making a purchase at the sponsor's store and receiving the code on the receipt, obtaining the code from the sponsor's advertisements, visit the sponsor's store and receive the code on a coupon, or using any other suitable approach. This way the fantasy sports contest application may provide the user with free access to the sponsor's various leagues.

In another suitable arrangement, the user may access a particular award league from, for example, at terminal at the sponsor's physical location at step 1406. For example, a McDonald's restaurant may have a terminal, through which the user may access the sponsor's league information.

At step 1408, the fantasy sports contest application may allow the user to enter a team to compete in the particular award league. At step 1410, the fantasy sports contest application may automatically select a team that was previously drafted by the user for an award league to enter into the currently selected award league. Alternatively, the fantasy sports contest application may allow the user to select a team that was drafted for a non-award league to enter into the currently selected award league.

At step 1212, the fantasy sports contest application may allow the user to draft a new team according to the rules associated with the award leagues to enter into the currently selected award league.

Figure 15:
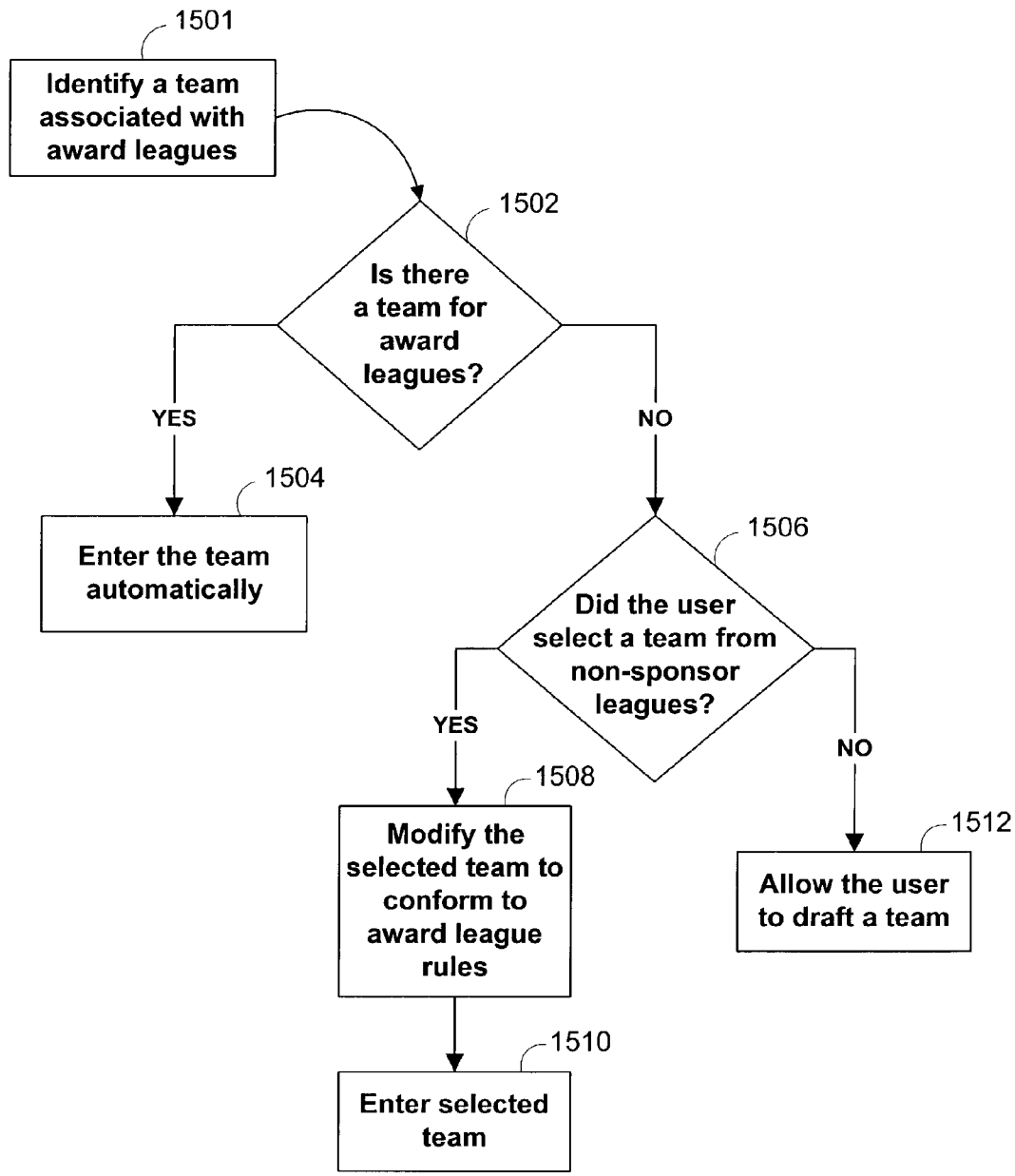
FIG. 15 is a flow chart of illustrative steps involved in selecting a team for the fantasy sports contest award league in accordance with one embodiment of the present invention.

FIG. 15 shows a flow chart of illustrative steps involved in selecting a team for the fantasy sports contest award league as shown in step 1410 of FIG. 14 in accordance with one embodiment of the present invention.

At step 1501, the fantasy sports contest application may try to identify a team that is associated with one or more of the award leagues. If the fantasy sports contest is able to identify a team that the user has previously drafted in order to participated in one or more award leagues at step 1502, the fantasy sports contest application may automatically enter the team into the currently selected award league at step 1504.

If the fantasy sports contest application determines that the user has not previously drafted such a team, the fantasy sports contest application may allow the user to select a team from teams that the user has drafted for a non-award league.

At step 1506, the fantasy sports contest application may determine whether the user has selected a team associated with a non-award league to enter in the particular award league. If the user has made such a selection, the fantasy sports contest application may examine the selected team for conformity with the award league rules and modify the selected team if the selected team does not conform completely to the rules of the award leagues at step 1508.

For example, the football award leagues may only permit 15 athletes to be on the roster. Based on this information, the fantasy sports contest application may modify a selected team associated with a non-award league that has 18 athletes by, for example, removing 3 athletes from the bench, to conform to the award league rules.

The fantasy sports contest application may then enter the user-selected team now consistent with the rules of the award leagues to compete in the currently selected award league at step 1510.

If the fantasy sports contest application determines that the user has declined to select from the user's existing non-award league teams (such a decision would be wise if the rules of the non-award league vary by a large amount from the rules of the award leagues) or that the user has never drafted a team for any fantasy sports league, the fantasy sports contest application may then allow the user to draft a new team at step 1512 as shown in FIG. 11.

Figure 16:
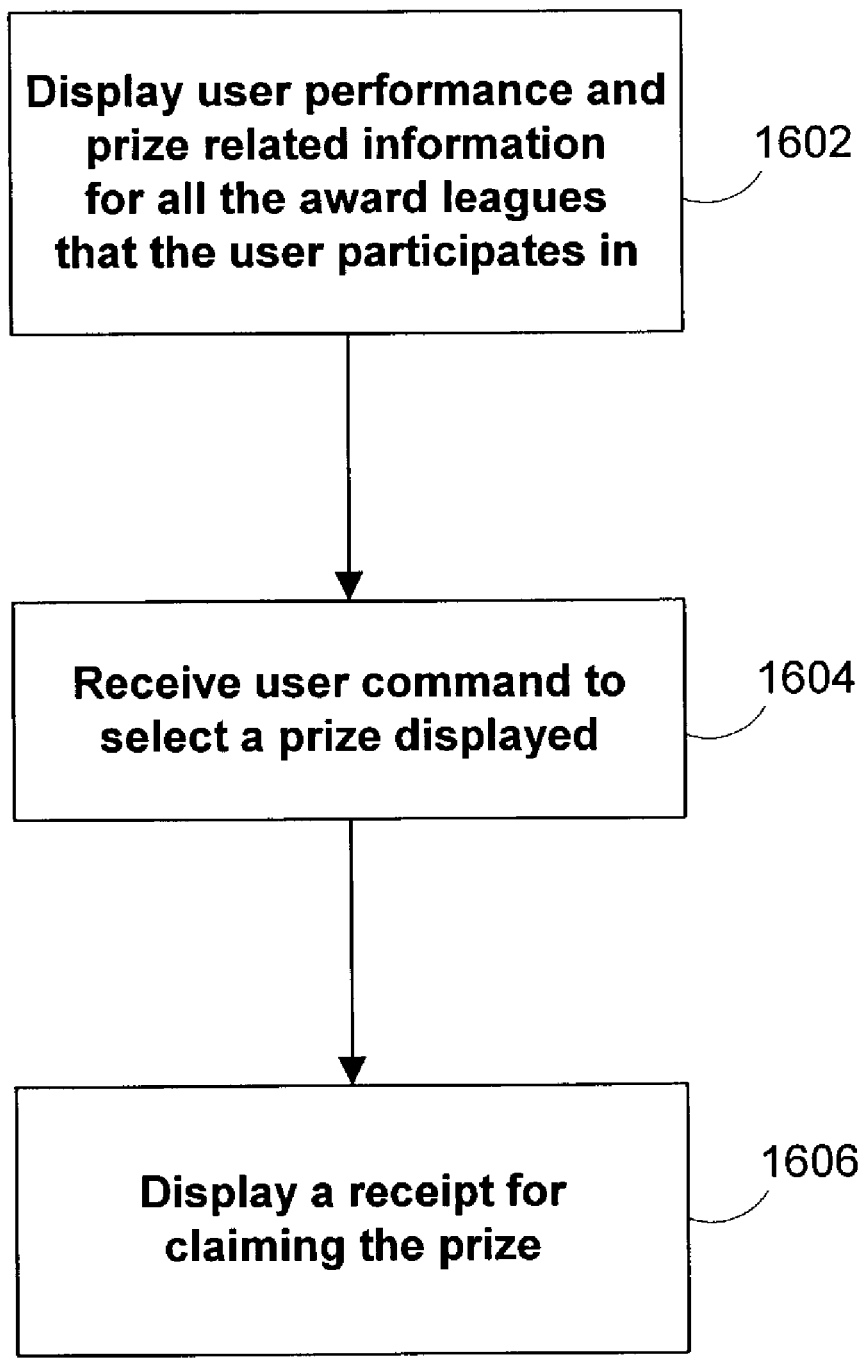
FIG. 16 is a flow chart of illustrative steps involved in allowing the user to claim prizes in accordance with one embodiment of the present invention.

FIG. 16 shows a flow chart of illustrative steps involved in allowing the user to claim prizes in accordance with one embodiment of the present invention. At step 1602, the fantasy sports contest application may display user performance information such as scores, rankings, prizes, or any other suitable information in connection with all the award leagues that the user currently participates in as shown in FIG. 12.

The fantasy sports contest application may receive a user command to select a displayed prize from the user at step 1604. The user may issue the command by, for example, pressing an "OK" button on a remote control, clicking on the link associated with the prize using a mouse, or using any other suitable approach.

In response to receiving the user command to select the prize displayed, the fantasy sports contest application may display a receipt (FIG. 13) including additional information for claiming the prize to the user for printing at step 1606.

Thus, systems and methods for providing multi-level fantasy sports contests in fantasy sports contest applications are provided. One skilled in the art will appreciate that the present invention may be practiced by other than the described embodiments, which are presented for purposes of illustration and not of limitation, and the present invention is limited only by the claims which follow.

What is claimed is:

1. A method for providing access to a first fantasy sports contest and a second fantasy sports contest to a user using a fantasy sports contest application implemented by processing circuitry in communication with user equipment the method comprising:
   identifying by the processing circuitry a first fantasy sports contest team roster associated with the first fantasy sports contest and with the user, the first fantasy sports contest taking place during a first time period; and
   automatically selecting by the processing circuitry at least a portion of a second fantasy sports contest team roster associated with the second fantasy sports contest and with the user from the first fantasy sports contest team roster, wherein the second fantasy sports contest takes place during a second time period that overlaps with the first time period.

2. The method of claim 1, wherein
   identifying the first fantasy sports contest team roster associated with the first fantasy sports contest comprises identifying a first fantasy sports contest team roster associated with a first set of team selection rules;
   automatically making at least a portion of the roster selection in the second fantasy sports contest team roster associated with the second fantasy sports contest comprises making at least a portion of the roster selections in the second fantasy sports team roster according to a second set of team selection rules; and
   the first set of team selection rules is different from the second set of team selection rules.

3. The method of claim 1, wherein:
   identifying the first fantasy sports contest team roster associated with the first fantasy sports contest comprises identifying a first fantasy sports contest associated with a first contest level that allows a first group of users having a first set of characteristics to make roster selections;
   automatically making at least a portion of the roster selections in the second fantasy sports contest team roster associated with the second fantasy sports contest comprises identifying a second fantasy sports contest associated with a second contest level that allows a second group of users having a second set of characteristics to make roster selections; and the first group of users and the second group of users share at least one user.

4. The method of claim 1, wherein identifying the first fantasy sports contest team roster associated with the first fantasy sports contest comprising:
   receiving a code that uniquely identifies the first fantasy sports contest from the user; and
   displaying information associated with the first fantasy sports contest in response to receiving the code from the user.

5. The method of claim 1, the system further comprising:
   displaying user performance information associated with the first fantasy sports contest to the user, and
   simultaneously displaying user performance information associated with the second fantasy sports contest to the user.

6. The method of claim 5, wherein displaying user performance information comprises displaying prize information.

7. The method of claim 6, the system further comprising:
   receiving user-command to obtain additional information associated with the prize information; and
   displaying the additional information associated with the prize information to the user in response to receiving the user-command.

8. The method of claim 7, wherein displaying the additional information associated with the prize information comprises displaying a receipt for claiming a prize.

9. The method of claim 8, wherein displaying the receipt for claiming the prize comprises displaying a confirmation code on the receipt, wherein the confirmation code uniquely identifies the receipt.

10. A system for providing access to a first fantasy sports contest and a second fantasy sports contest to a user using a fantasy sports contest application, the system comprising:
    means for identifying a first fantasy sports contest team roster associated with the first fantasy sports contest and with the user, the first fantasy sports contest taking place during a first time period; and
    means for automatically selecting at least a portion of a second fantasy sports contest team roster associated with the second fantasy sports contest and with the user from the first fantasy sports contest team roster, wherein the second fantasy sports contest takes place during a second time period that overlaps with the first time period.

11. The system of claim 10, wherein:
    the means for identifying the first fantasy sports contest team roster associated with the first fantasy sports contest comprises means for identifying a first fantasy sports contest team roster associated with a first set of team selection rules;
    the means for automatically making at least a portion of the roster selection in the second fantasy sports contest team roster associated with the second fantasy sports contest comprises means for making at least a portion of the roster selections in the second fantasy sports team roster according to a second set of team selection rules; and
    the first set of team selection rules is different from the second set of team selection rules.

12. The system of claim 10, wherein:
    the means for identifying the first fantasy sports contest team roster associated with the first fantasy sports contest comprises means for identifying a first fantasy sports contest associated with a first contest level that allows a first group of users having a first set of characteristics to make roster selections;

the means for automatically making at least a portion of the roster selections in the second fantasy sports contest team roster associated with the second fantasy sports contest comprises means for identifying a second fantasy sports contest associated with a second contest level that allows a second group of users having a second set of characteristics to make roster selections; and the first group of users and the second group of users share at least one user.

13. The system of claim 10, wherein the means for identifying the first fantasy sports contest team roster associated with the first fantasy sports contest comprising:

means for receiving a code that uniquely identifies the first fantasy sports contest from the user; and means for displaying information associated with the first fantasy sports contest in response to receiving the code from the user.

14. The system of claim 10, the system further comprising:

means for displaying user performance information associated with the first fantasy sports contest to the user, and means for simultaneously displaying user performance information associated with the second fantasy sports contest to the user.

15. The system of claim 14, wherein the means for displaying user performance information comprises means for displaying prize information.

16. The system of claim 15, the system further comprising:

means for receiving user-command to obtain additional information associated with the prize information; and means for displaying the additional information associated with the prize information to the user in response to receiving the user-command.

17. The system of claim 16, wherein the means for displaying the additional information associated with the prize information comprises means for displaying a receipt for claiming a prize.

18. The system of claim 17, wherein the means for displaying the receipt for claiming the prize comprises means for displaying a confirmation code on the receipt, wherein the confirmation code uniquely identifies the receipt.

19. A system for providing access to a first fantasy sports contest and a second fantasy sports contest to a user using a fantasy sports contest application, the system comprising:

a user input device;

a user output device comprising a display device; and server equipment and user equipment configured to;

identify a first fantasy sports contest team roster associated with the first fantasy sports contest and with the user, the first fantasy sports contest taking place during a first time period; and automatically select at least a portion of a second fantasy sports contest team roster associated with the second fantasy sports contest and with the user from the first fantasy sports contest team roster, wherein the second fantasy sports contest takes place during a second time period that overlaps with the first time period.

20. The system of claim 19, wherein the server equipment and the user equipment are configured to:

identify a first fantasy sports contest team roster associated with a first set of team selection rules; and make at least a portion of the roster selections in the second fantasy sports team roster according to a second set of team selection rules, wherein the first set of team selection rules is different from the second set of team selection rules.

21. The system of claim 19, wherein the server equipment and the user equipment are configured to:

identify a first fantasy sports contest associated with a first contest level that allows a first group of users having a first set of characteristics to make roster selections; and identify a second fantasy sports contest associated with a second contest level that allows a second group of users having a second set of characteristics to make roster selections, wherein the first group of users and the second group of users share at least one user.

22. The system of claim 19, wherein the server equipment and the user equipment are configured to:

receive a code that uniquely identifies the first fantasy sports contest from the user; and display information associated with the first fantasy sports contest in response to receiving the code from the user.

23. The system of claim 19, the system further comprising:

display user performance information associated with the first fantasy sports contest to the user, and simultaneously display user performance information associated with the second fantasy sports contest to the user.

24. The system of claim 23, wherein the server equipment and the user equipment are configured to display prize information.

25. The system of claim 24, the system further comprising:

receive user-command to obtain additional information associated with the prize information; and display the additional information associated with the prize information to the user in response to receiving the user-command.

26. The system of claim 25, wherein the server equipment and the user equipment are configured to display a receipt for claiming a prize.

27. The system of claim 26, wherein the server equipment and the user equipment are configured to display a confirmation code on the receipt, wherein the confirmation code uniquely identifies the receipt.

28. Machine-readable media for providing access to a first fantasy sports contest and a second fantasy sports contest to a user using a fantasy sports contest application implemented by processing circuitry wherein the machine-readable media is encoded with machine-readable instructions for performing the method comprising:

identifying by the processing circuitry a first fantasy sports contest team roster associated with the first fantasy sports contest and with the user, the first fantasy sports contest taking place during a first time period; and automatically selecting by the processing circuitry at least a portion of a second fantasy sports contest team roster associated with the second fantasy sports contest and with the user from the first fantasy sports contest team roster, wherein the second fantasy sports contest takes place during a second time period that overlaps with the first time period.

29. The machine-readable media of claim 28, wherein identifying the first fantasy sports contest team roster associated with the first fantasy sports contest comprises identifying a first fantasy sports contest team roster associated with a first set of team selection rules;

wherein automatically making at least a portion of the roster selection in the second fantasy sports contest team roster associated with the second fantasy sports contest comprises making at least a portion of the roster selections in the second fantasy sports team roster according to a second set of team selection rules; and wherein the first set of team selection rules is different from the second set of team selection rules.

30. The machine-readable media of claim 28, wherein identifying the first fantasy sports contest team roster associated with the first fantasy sports contest comprises identifying a first fantasy sports contest associated with a first contest level that allows a first group of users having a first set of characteristics to make roster selections;

wherein automatically making at least a portion of the roster selections in the second fantasy sports contest team roster associated with the second fantasy sports contest comprises identifying a second fantasy sports contest associated with a second contest level that allows a second group of users having a second set of characteristics to make roster selections; and wherein the first group of users and the second group of users share at least one user.

31. The machine-readable media of claim 28, wherein identifying the first fantasy sports contest team roster associated with the first fantasy sports contest comprising:

receiving a code that uniquely identifies the first fantasy sports contest from the user; and displaying information associated with the first fantasy sports contest in response to receiving the code from the user.

32. The machine-readable media of claim 28, the system further comprising:

displaying user performance information associated with the first fantasy sports contest to the user, and simultaneously displaying user performance information associated with the second fantasy sports contest to the user.

33. The machine-readable media of claim 32, wherein displaying user performance information comprises displaying prize information.

34. The machine-readable media of claim 33, the system further comprising:

receiving user-command to obtain additional information associated with the prize information; and displaying the additional information associated with the prize information to the user in response to receiving the user-command.

35. The machine-readable media of claim 34, wherein displaying the additional information associated with the prize information comprises displaying a receipt for claiming a prize.

36. The machine-readable media of claim 35, wherein displaying the receipt for claiming the prize comprises displaying a confirmation code on the receipt, wherein the confirmation code uniquely identifies the receipt.

* * * * *

UNITED STATES PATENT AND TRADEMARK OFFICE
CERTIFICATE OF CORRECTION

| | | |
|---|---|---|
| PATENT NO. | : 7,614,944 B1 | Page 1 of 1 |
| APPLICATION NO. | : 10/234346 | |
| DATED | : November 10, 2009 | |
| INVENTOR(S) | : Hughes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1815 days.

Signed and Sealed this

Nineteenth Day of October, 2010

David J. Kappos
*Director of the United States Patent and Trademark Office*